INVENTOR.
RENÉ FRANÇOIS LUCAS

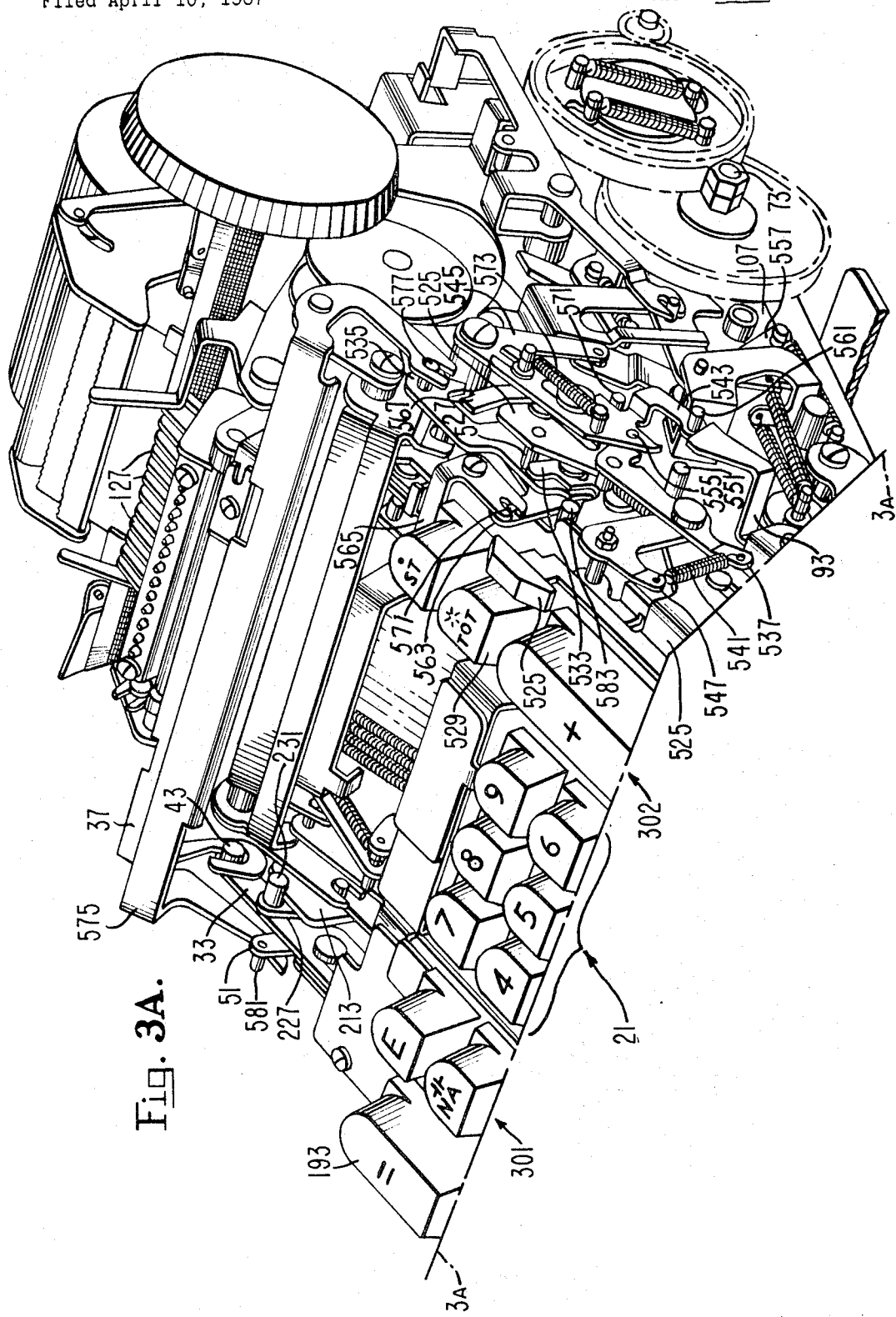

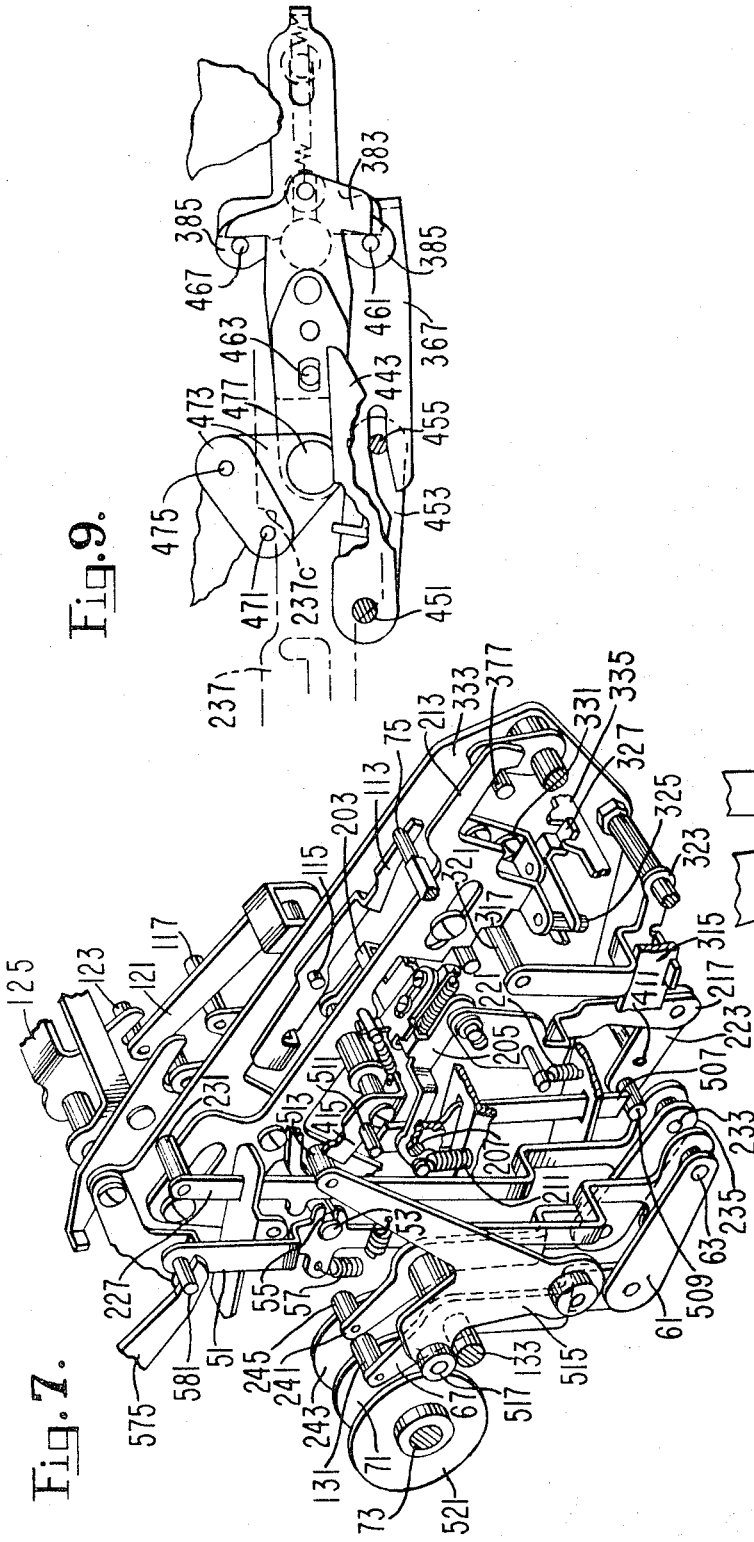
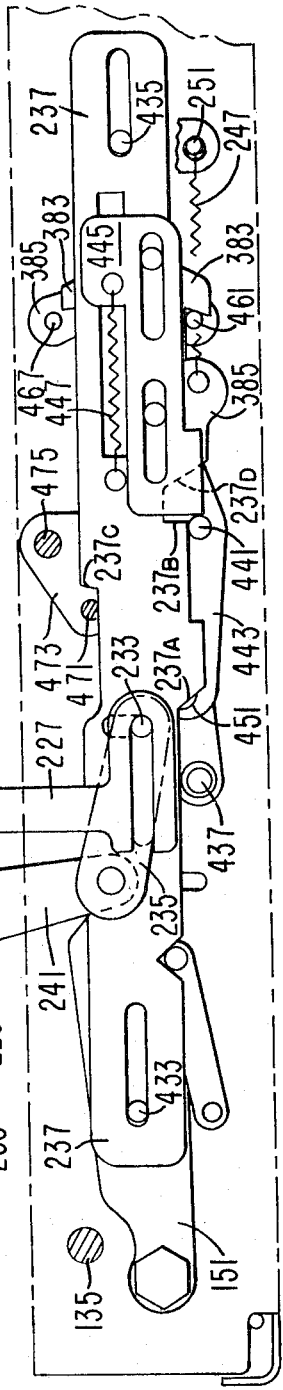
Fig. 7.   Fig. 9.   Fig. 8.

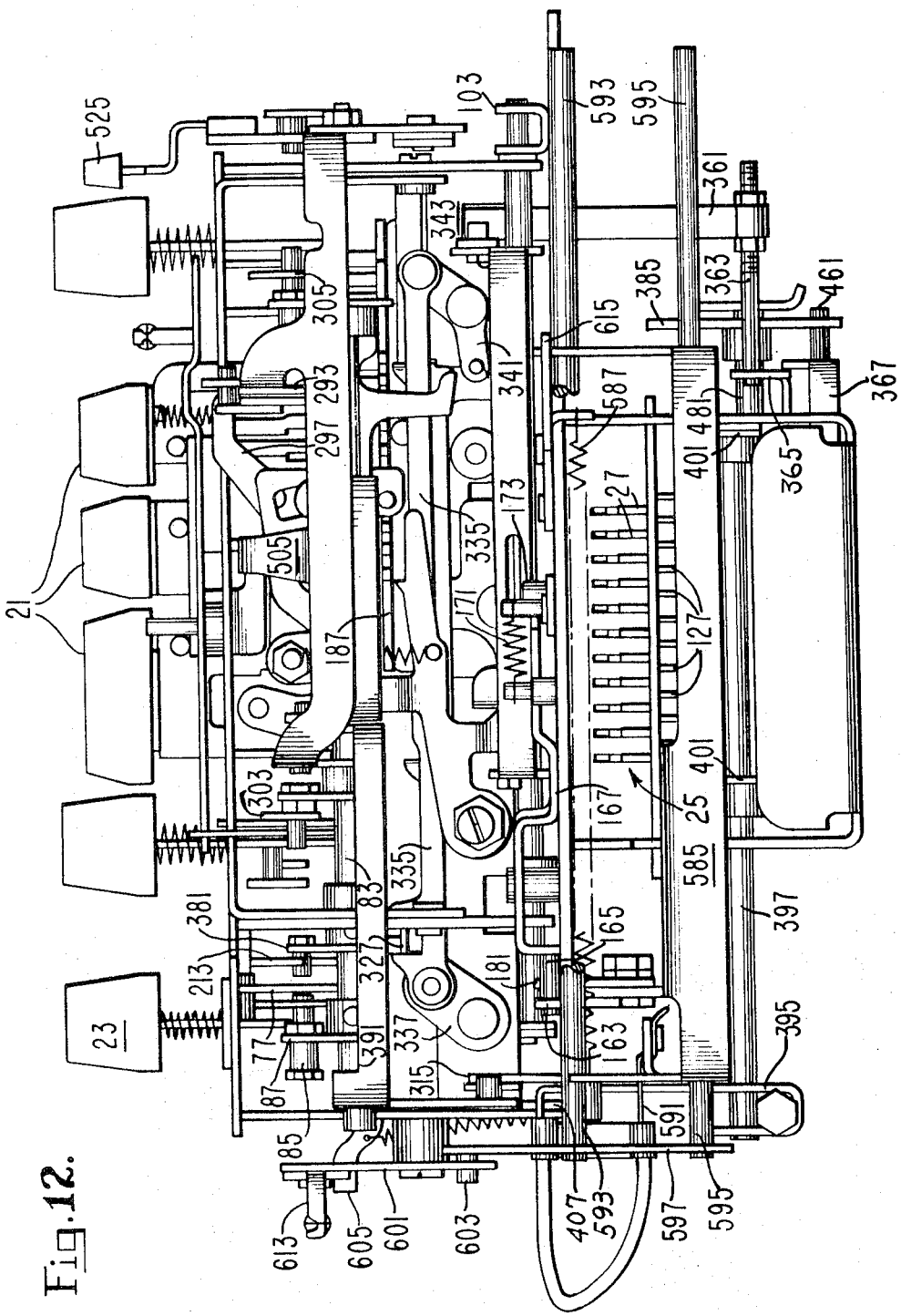

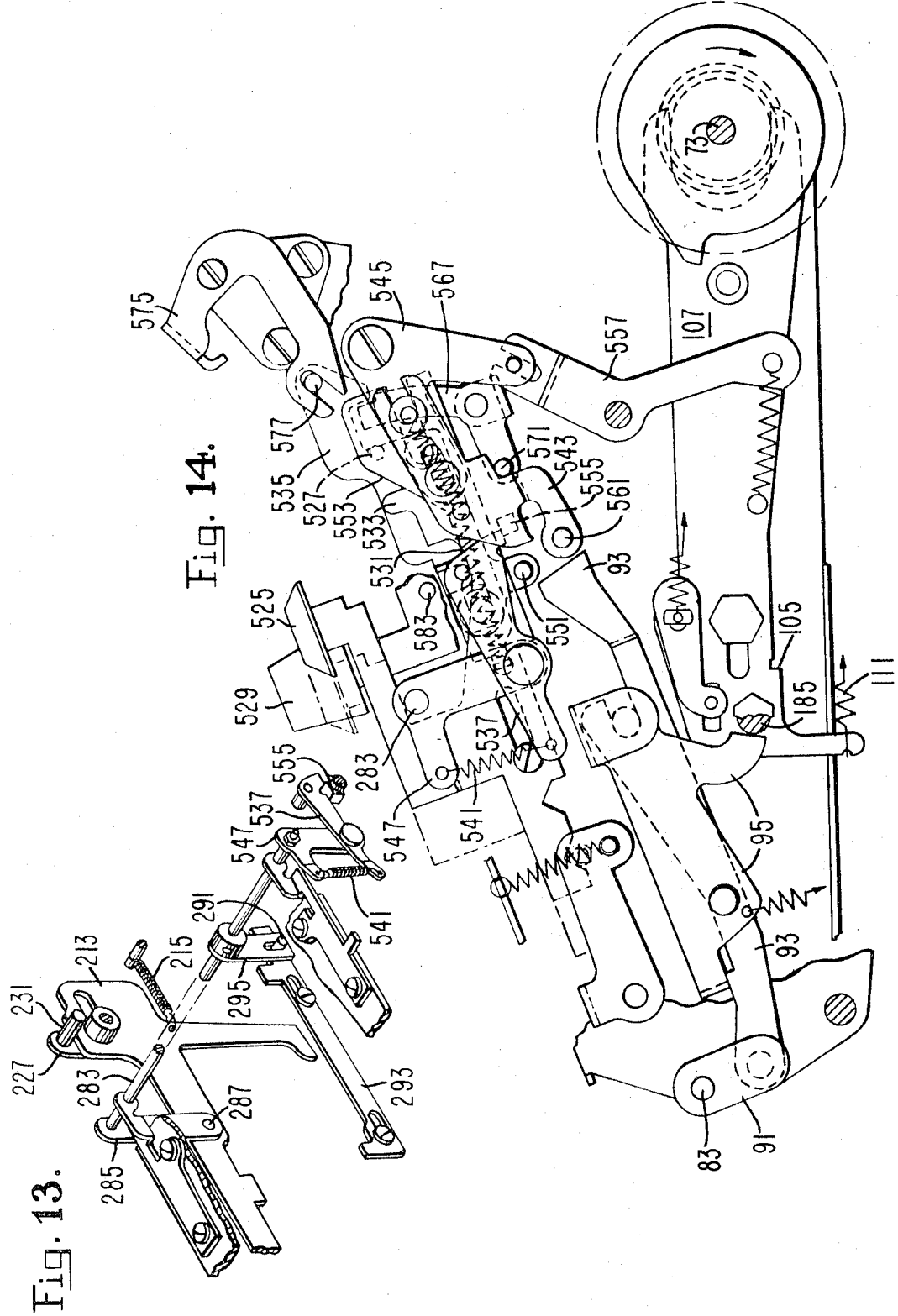

United States Patent Office 3,451,618
Patented June 24, 1969

3,451,618
TEN KEY MULTIPLYING MACHINE
René F. Lucas, Noisy-le-Sec, France, assignor to Burroughs Corporation, Detroit, Mich., a corporation of Michigan
Filed Apr. 10, 1967, Ser. No. 629,741
Int. Cl. G06c 29/00
U.S. Cl. 235—60                                    24 Claims

ABSTRACT OF THE DISCLOSURE

A single-keyboard adder, subtractor and multiplier uses two sets of elements for multiplication: slidable elements for storing one factor, and a pin carriage for storing a second factor. A variably-movable pawl and projection cooperating with the first factor elements control the necessary repeated additions and subtractions of the second factor. A printer has two sections that are coupled together for printing factors and results but uncoupled to suppress the printing of partial products. The totalized result of one operation is transferred to the first factor elements for use in chain multiplication. An interlock device enforces entry of the second factor and prevents multiplication when the factors used would produce a product greater than machine capacity.

BACKGROUND OF THE INVENTION

Printing calculators have been known to accomplish substantially the same or similar results as the subject of this application, including arithmetic addition and subtraction and short-cut multiplication, and to provide multiplying features comparable to those hereinafter described, such as single-keyboard entry of factors, chain multiplication, print factors and result only, and cycle prevention when attempting to multiply factors of excessive length.

These known machines have generally been characterized by such an intricacy of design and multiplicity of parts as to be rendered both expensive to build and cumbersome to maintain and repair.

The present invention is embodied in a proven ten key printing calculator, which was disclosed in U.S. Patent 3,057,550 entitled "Ten Key Calculating Machine" and assigned to the assignee of this application. This previously disclosed machine is capable of adding, subtracting, taking totals and subtotals, and printing both true positive and true negative totals. Aspects of the machine which are described in the aforementioned patent and utilized in the present invention include: numerical input keys; a transversely movable pin carriage comprising a plurality of settable members for limiting type bars in differential printing positions; cycling and cycle initiating means; a function control mechanism; printing means; a totalizer; actuators for additively and subtractively transferring indexed amounts from the pin carriage to the totalizer; a total key for printing and clearing accumulated amounts from the totalizer; a subtotal key for printing and retaining accumulated amounts; a symbol printing mechanism for identifying printed items; a repeat key and associated mechanism for initiating machine cycles during which indexed amounts are retained in the pin carriage; a nonadd key and related mechanism for printing indexed amounts without accumulating these amounts in the totalizer; and an error key for clearing the pin carriage of incorrectly indexed amounts without accumulating or printing such amounts.

Inasmuch as the preferred embodiment of the present invention comprises novel means which cooperate with mechanisms disclosed in the aforementioned patent, the latter mechanisms have for the most part been omitted from both the drawings and language of this specification. Reference will accordingly be found in the following descriptive material to the cooperation of described means with broadly referenced conventional means the detailed description of which may be found in U.S. Patent 3,057,550.

SUMMARY OF THE INVENTION

An object of the present invention is to provide a multiple-function printing calculator comprising rugged and simplified function enabling mechanisms that are economical to manufacture and convenient to repair and maintain. It is also an object of this invention to provide improved and more efficient means for accomplishing short-cut multiplication, and to render the automatic clearing of computed results optional under the keyboard control of the operator.

An important aspect of this invention in accomplishing the function of multiplication is a plurality of storing elements which are slidable forwardly from home position to receive a first multiplying factor, and slidable rearwardly or forwardly from their initial forwardly displaced positions to effectively count the number of additions and subtractions of a second multiplying factor in a totalizer. A pin carriage is used for storing the second multiplying factor, as this factor, in response to a single operation of a cycle initiating member, is repeatedly added or subtracted in the totalizer according to the digit values of the first factor.

Another aspect of the invention is a sensing and cycle counting device which has a moving pawl that is movable upwardly to the differential sensing limits provided by the individual first factor storing elements to effectuate the addition or subtraction of the second factor in the totalizer, and movable rearwardly or forwardly during each multiplying machine cycle to transmit one unit of rearward restoring or forward advancing movement to individual first factor storing elements as the latter elements perform their cycle counting function.

Still another aspect of the invention is a cycle controlling device having a projection which is movable upwardly to sense the rearward home or full advanced positioning of individual first factor storing elements. The projection, when such positioning is sensed, is effective in cooperation with pin carriage escapement means to shift both the moving pawl and movable projection into cooperating alignment with the leftwardly adjoining first factor storing element.

An additional aspect of this invention is a cycle terminating device having a movable bail which is movable downwardly to sense the rearward home or full advanced positioning of all first factor storing elements. This bail is effective, when such positioning is sensed, to terminate multiplying machine cycles and to condition the machine for either an automatic or manual totalizing cycle depending upon the preset positioning of an operator-controlled keyboard slide.

BRIEF DESCRIPTION OF THE DRAWINGS

These and other objects, aspects, and advantages of the invention will be more clearly understood from the following description when read in conjunction with the accompanying drawings, in which:

FIGURE 3A is a partial perspective taken from the right front corner and separated at line 3A;

FIGURE 7 is a partial left front perspective with various external parts removed to reveal inner mechanisms;

FIGURE 8 is a fragmentary left side elevation of the lower section of the machine;

FIGURE 9 is a fragmentary left side elevation of details concealed in FIGURE 8;

FIGURE 12 is a partial front elevation of the machine;

FIGURE 13 is a partial right front perspective showing details of the automatic total mechanism;

FIGURE 14 is a partial right side elevation with certain external parts removed to reveal interior construction.

DETAILED DESCRIPTION OF THE INVENTION

Entering the first multiplying factor

The multiplicand, or first multiplying factor, is entered by means of the numerical keys 21 (FIGURE 1) and a first-cycle initiating member or multiplicand-entering motor bar 23. When the numerical keys 21 are indexed, the digit values of the multiplicand are set up in a transversely movable pin carriage 187 (FIGURE 5) comprised of settable members which are effective to limit conventional type bars in printing position. Depression of the multiplicand-entering motor bar 23 (FIGURE 1) results in a machine cycle which is effective to non-add the indexed amount in a conventional totalizer, to print the amount on paper tape, and to transfer that amount to a plurality of first factor storing elements 27 (FIGURES 5 and 12) which are disposed longitudinally in the base of the machine. The forward displacement of these storing elements 27, during such transfer, in cooperation with hereinafter described means, is effective to control the additions and subtractions that are required in short-cut multiplication.

As is customary in multiplying machines of this type, the first multiplying factor, although referred to as the "multiplicand," is processed as the true multiplier in that it represents the number of times another number is to be added or "taken." The second multiplying factor, on the other hand, represents the number that is to be added or "taken" a given number of times, and is accordingly the true multiplicand. This reversal of factors is necessary because the intermediate keyboard or pin carriage, comprising conventional means for transferring amounts into a totalizer, is utilized in the entry of both factors and for the storage of one. It follows, therefore, that the pin carriage must be utilized as storage means for the second factor, and the second factor must be processed as the multiplicand or the number that is to be added or "taken" a given number of times.

Figure 4:
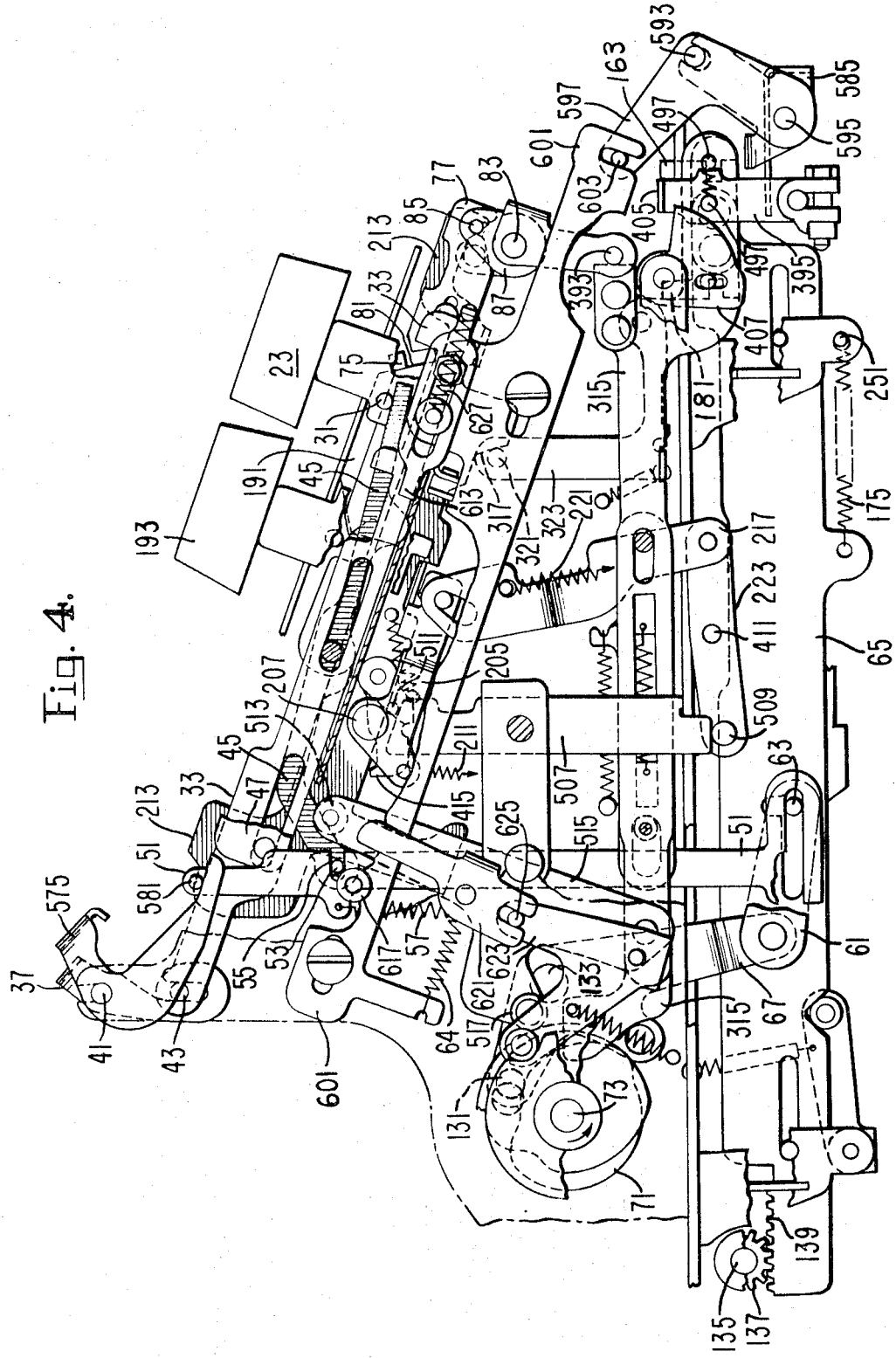
FIGURE 4 is a partial left side elevation.
Figure 6:
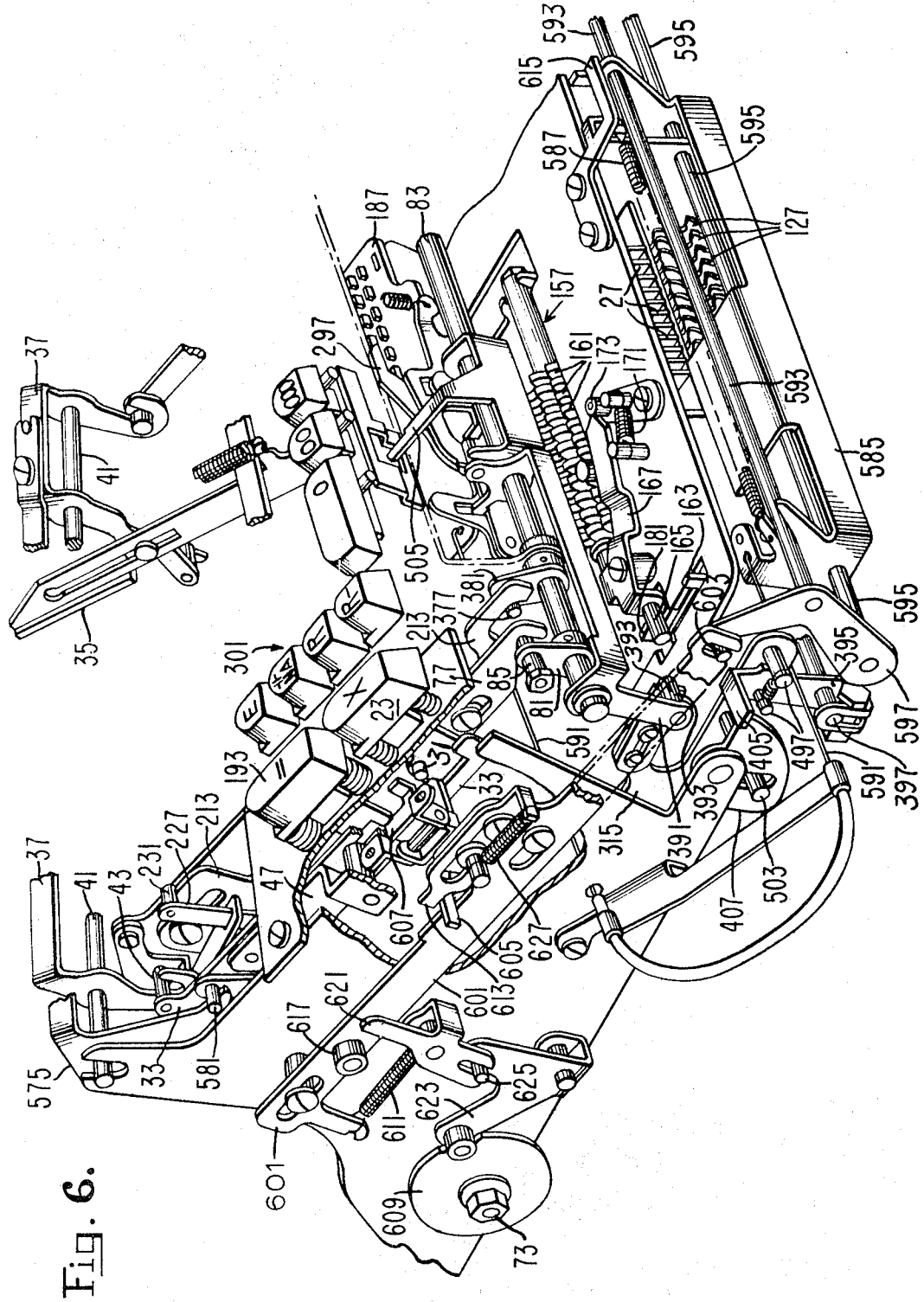
FIGURE 6 is a partial perspective taken from the left front corner.

When the multiplicand-entering motor bar 23 is depressed, an outwardly extending stud 31 (FIGURE 4) of the motor bar is lowered into the path of a vertical abutment on a symbol indexing slide 33 (FIGURES 4 and 6). A symbol type bar 35 (FIGURE 6) is spring-urged rearwardly through conventional means early in the resulting machine cycle to move the symbol indexing slide 33 rearward through the clockwise rocking of a symbol bail 37. Rearward movement of the symbol indexing slide 33 is limited by contact of the vertical abutment in the foremost extremity of the slide against the outwardly extending stud 31 of the motor bar to position a multiplicand indication symbol in printing position.

The lowering of the outwardly extending stud 31 also causes the clockwise rocking of a multiplicand indexing lever 45 (FIGURE 4) which pivots on a stud riveted to a side plate 47 (FIGURE 6). Clockwise rocking of the indexing lever 45 (FIGURE 4) raises a multiplicand activating arm 51 (FIGURES 4 and 7) through engagement of a stud 53 with a slot 55. Upward movement of the activating arm 51, against the bias of a spring 57, causes the forward end of a pivoting arm 61 (FIGURE 4) to be elevated through engagement of an enclosed horizontal slot with a short shaft 63 riveted to a pivoting arm 61. The short shaft 63 is accordingly raised into a vertical slot in a multiplicand indexing slide 65 to effectively couple the slide 65 with a multiplicand driver lever 67 to which the pivoting arm 61 is pivotally attached at its lower extremity. Coupling of the indexing slide 65 and the driver lever 67 prepares the slide for rearward activation as provided by a cam 71 of a main drive shaft 73 when a conventional drive trip mechanism is triggered to initiate a motor-driven machine cycle.

Depression of the multiplicand-entering motor bar 23, through the lowering of an inwardly extending stud 75 (FIGURES 4 and 7), also causes the rearward activation of a notched slide 77 (FIGURE 4) through the camming action of the stud against a diagonal surface 81. Rearward movement of the notched slide 77 causes the counterclockwise rotation of a drive trip shaft 83 (as viewed in FIGURE 4) through engagement of a slot in the forward extremity of the slide 77 with an adjustable stud 85 of an arm 87 which is rigidly attached to the drive trip shaft 83. The counterclockwise rotation of the drive trip shaft 83 causes a blocking arm 93 (FIGURE 15) attached to the rightmost extremity of the shaft by means of an arm 91, to be moved forwardly to permit an intermediary latch arm 95 to be rocked counterclockwise through spring urging so that its foremost offset projection comes to rest against a lower horizontal surface of the blocking arm 93. The counterclockwise rocking of the intermediary latch arm 95, through contact of an adjustable collar 97 with a projection 101 of a latch arm 103, causes the latch arm 103 to be rocked clockwise against spring urging to release a step 105 of a conventional drive trip slide 107. Release of the step 105 causes the drive trip slide 107 to be spring activated rearward to close the motor switch points and to initiate a machine cycle during which a main drive shaft 73 is rotated clockwise (as viewed in FIGURE 15) to activate the various machine functions through cam attached to the main drive shaft 73.

The lowering of the inwardly extending stud 75 (FIGURE 7) also causes the clockwise rocking of a non-add lever 113 on a pivot stud 115 to rock a lever 121 clockwise through an inwardly extending stud 117. Conventional non-add linkage is activated by the clockwise rocking of the lever 121 through engagement of a stud 123 with a slot in the left extremity of a non-add bail 125.

Figure 5:
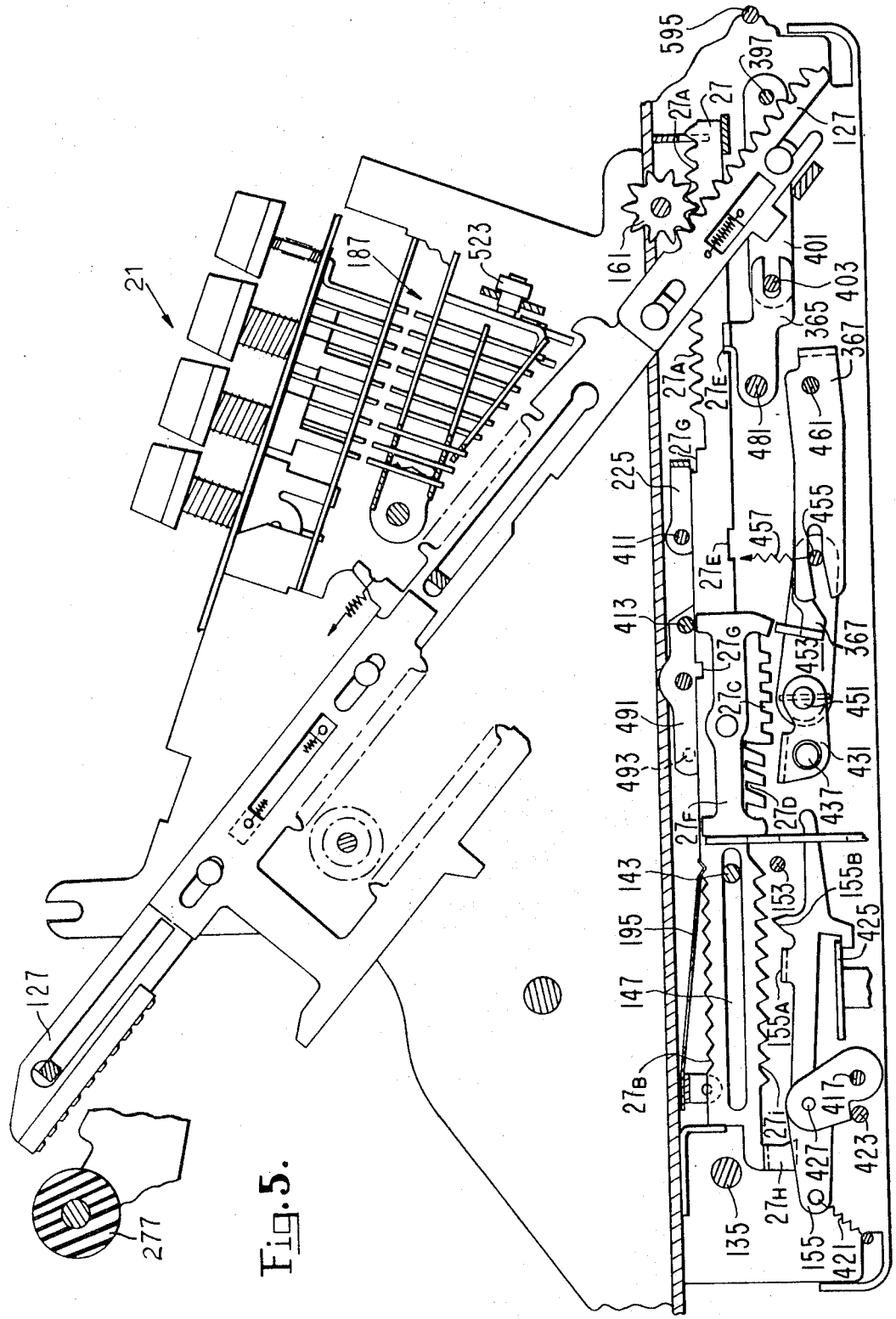
FIGURE 5 is a left side sectional elevation.

When the multiplicand-entering machine cycle is initiated through rearward movement of the drive trip slide 107 by a spring 111 (FIGURES 3B, 14 and 15), the type bars 127 (FIGURES 3A and 5) are permitted spring-urged rearward movement through conventional means to be limited by set elements in a pin carriage 187 (FIGURES 5 and 6). Coincidentally with the rearward movement of the type bars, during the early portion of the multiplicand-entering machine cycle, the multiplicand indexing slide 65 (FIGURE 4), through its aforementioned coupling with the pivoting arm 61 (FIGURES 4 and 7), is activated rearward through the rotating action of the cam 71 on a roller 131 (FIGURE 7) of the multiplicand driver lever 67, the latter lever pivoting on a shaft 133.

As the multiplicand indexing slide 65 (FIGURE 4) moves rearward, a shaft 135 is rotated clockwise through the action of teeth 139 disposed on the upper rearmost extremity of the indexing slide 65 on a toothed collar 137 affixed to the outer extremity of the shaft 135. Rotation of the shaft 135 is effective to rock the arms 141 (FIGURE 15) attached thereto through 180° of counterclockwise rotation (as veiwed in FIGURE 15) to move a storing element restoring shaft 143 rearward through the connecting links 145. Forwardly displaced storing elements 27 (FIGURE 5) are restored rearwardly to home position through contact of the rearwardly moving restoring shaft 143 against the rear extremities of the slots 147. As the restoring shaft 143 (FIGURE 15) moves rearward, the diagonal surfaces of the levers 151 are cammed counterclockwise against the bias of the springs 177, thereby lowering a shaft 153 to reset the storing element carry pawls 155 (FIGURE 5) through contact with their forwardly extending tails.

Later in the first half of the multiplicand-entering machine cycle, after the forwardly displaced storing elements 27 (FIGURE 5) have been restored rearwardly to home position and the type bars 127 have been moved rearwardly to printing position through conventional means, continued rearward movement of the multiplicand indexing slide 65 (FIGURE 4) causes a pinion assembly 157 (FIGURE 6) to be shifted to the right so that the individual pinions 161 are engaged with both the rearwardly displaced type bars 127 and the rearwardly restored storing elements 27. Rightward shifting of the pinion assembly 157 is accomplished through contact of a forward upright projection 163 of the multiplicand indexing slide 65 (FIGURE 4) with a stud 165 (FIGURE 6) of a pinion locating detent lever 167. The latter lever is held in both its clockwise and counterclockwise rocked positions by the action of a spring 171 and a locating roller 173.

During the second half of the multiplicand-entering machine cycle, after the first multiplying factor has been printed through conventional means, the type bars 127 are moved forwardly to home position, also through conventional means, and the multiplicand indexing slide 65 (FIGURE 4) is restored forwardly through a spring 175 as permitted by the contour of the cam 71. The forward restoring movement of the type bars 127 (FIGURE 5), through the transferring action of the pinions 161, causes the storing elements 27 to be moved forward a distance corresponding to the forward restoring movement of the type bars. This distance represents the digit values of the multiplicand. The forward restoring movement of the multiplicand indexing slide 65 (FIGURE 4) causes the counterclockwise rotation of the toothed collar 137 and the shaft 135 to rotate the arms 141 clockwise (as viewed in FIGURE 15) and to thereby activate the connecting links 145 and the restoring shaft 143 forwardly to permit the forward displacing movement of the storing elements 27.

As the storing element restoring shaft 143 approaches its forward home position, the levers 151 are released and the shaft 153 is urged upwardly by the springs 177 to a position where it will not interfere with the tripping of the individual storing element carry pawls 155 (FIGURE 5) duing subsequent multiplying machine cycles when the second multiplying factor is subtractively accumulated in the totalizer, as hereinafter explained.

As the multiplicand indexing slide 65 (FIGURE 4) nears its forward home position, as activated by the spring 175, a second upright projection 181 (FIGURE 6) of the indexing slide contacts the stud 165 to rock the pinion locating detent lever 167 counterclockwise against the tension of the spring 171. The pinion assembly 157 is thereby shifted to the left so that the individual pinions 161 are disengaged from the teeth of the type bars 127 to remain engaged thereafter only with the various denominational orders of the storing elements 27.

Near the end of the second half of the multiplicand-entering machine cycle, the pin carriage 187 is restored rightwardly to home position through conventional means to reset the set elements therein contained to their upper inactivated positions.

At the conclusion of the multiplicand-entering machine cycle, the drive trip slide 107 (FIGURE 15) is restored forwardly through conventional cam and roller action to terminate machine cycling through the relatching of the latch arm 103 with the step 105 of the drive trip slide. Such relatching is accomplished through the clockwise rocking of the intermediary latch arm 95 by an adjustable collar 185 and the consequent spring-urged countercloskwise rocking of the latch arm 103. The clockwise rocking of the intermediary latch arm 95 serves also to release the blocking arm 93 which is spring activated rearwardly to bring its forward higher horizontal surface into blocking position with the offset projection of the intermediary latch arm 95. Rearward movement of the blocking arm 93 is accompanied by the counterclockwise rocking of the drive trip shaft 83 which activates the notched slide 77 (FIGURES 4 and 6) forwardly through the adjustable stud 85 to permit the spring-urged upward restoration of the multiplicand-entering motor bar 23. Restoration of the multiplicand-entering motor bar 23, upon completion of the multiplicand-entering cycle, serves to free a floating interlock 191 (FIGURE 4) to enable depression of the second-cycle initiating member or multiplier-entering motor bar 193.

Figure 2:
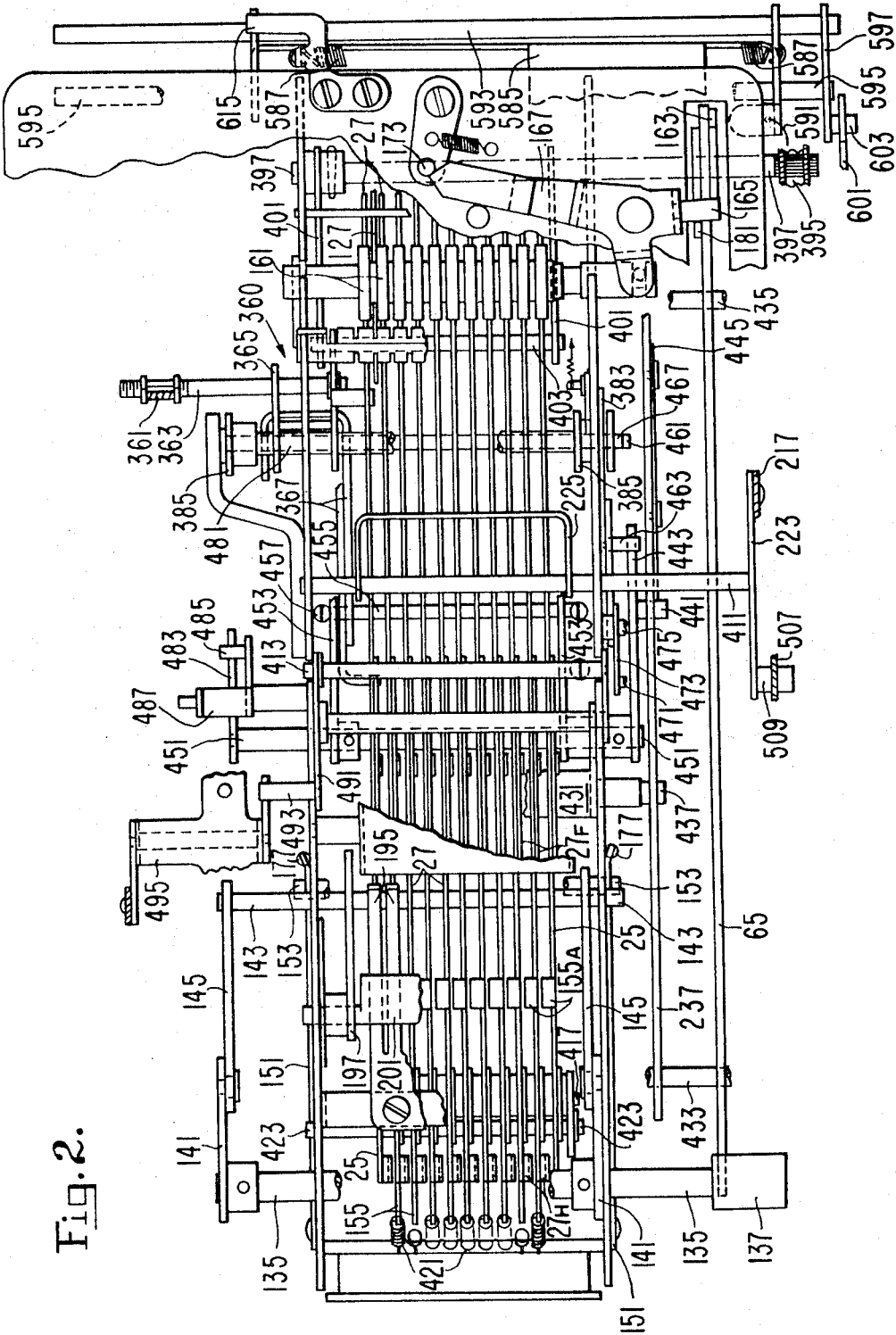
FIGURE 2 is a partial plan view of the lower section of the machine.

The forwardly displaced storing elements 27 are retained in displaced positions corresponding to the digit values of the multiplicand by the finger springs 195 (FIGURES 2 and 5) whch normally apply retentive tension against the upper notches 27B (FIGURE 5) of the storing elements 27. These finger springs apply maximum retentive tension against the storing elements when the restoring shaft 143 (FIGURES 2 and 15) is located in its extreme forward position. When in this position, a downwardly extending hooked portion of a finger bail arm 197 (FIGURE 2) is forced downward by the restoring shaft 143 to apply optimum clockwise pressure on the finger springs through a cross-lying finger member 201. The pressure of the finger springs 195 on the upper notches 27B (FIGURE 5) is minimized during multiplicand entering as the restoring shaft 143 is moved rearwardly, as previously described, such rearward movement of the restoring shaft 143 being effective to release the finger bail arm 197 (FIGURE 2).

Upon completion of the multiplicand-entering machine cycle, the forwardly displaced storing elements 27 are cooperated with by a sensing and cycle counting device 360 to provide automatic control over short-cut multiplication, such multiplication proceeding automatically from depression of the multiplier-entering motor bar 193 (FIGURE 1) in conjunction with second factor entry as described in the following section.

Entering the second multiplying factor

The second factor of a multiplying computation is entered through depression of a second-cycle initiating member which is otherwise referred to as the multiplier-entering motor bar 193, after having entered the various digit values of the second factor in the numerical keys 21. The combined result of this key and motor bar depression is: (1) entry of the second factor into the pin carriage 187 (FIGURE 5) which serves as memory storage for the second factor, (2) printing of the second factor on paper tape, and (3) conditioning the machine for automatic machine cycling during which the second factor is repeatedly added or subtracted in the totalizer as controlled by the sensing and cycle counting device 360 (FIGURE 2) in cooperation with the previously described forwardly displaced storing elements 27.

Depression of the multiplier-entering motor bar 193 (FIGURE 1), through contact of its lower extremity with a latching plate 203 (FIGURE 7), lowers the latching plate and rocks a latching lever 205 clockwise on a stud 207 against the bias of a spring 211. A forward upright projection of the latching plate 203 thereby releases a cut-out portion of a multiplier indexing slide 213 to permit the indexing slide to be activated rearward through the urging of a spring 215 (FIGURE 13). Clockwise rocking of the latching lever 205 (FIGURE 7) also permits the lowering of an offset link 217 through the bias of a spring 221 to thereby rock a bail lever 223 and a shaft 411 clockwise to position a cross-lying sensing bail 225 (FIGURE 2) of a cycle terminating device into sensing contact with the upper surfaces of the storing elements 27.

Rearward movement of the multiplier indexing slide 213 (FIGURE 7), as activated by the spring 215 (FIGURE 13) when released by the lowering of the latching plate 203 (FIGURE 7), serves to condition the machine in accordance with the functional controls that are required of automatic multiplication. An elevated surface on the upper rearmost extremity of the indexing slide 213 raises an activating arm 227 through a stud 231 to elevate a short shaft 233 through an enclosed horizontal slot on the lower extremity of the activating arm 227 into a vertical slot in a multiplier sensing slide 237 (FIGURE 8). The multiplier sensing slide 237 is thereby coupled with a driver lever 241 (FIGURES 7 and 8) through a pivoting arm 235 to provide the sensing slide with a cam-driven rearward movement followed by a spring-activated forward restoring movement on each automatic machine cycle that is involved in the multiplying process. Rearward movement of the multiplied sensing slide 237 (FIGURE 8) is accomplished through a cam 243 (FIGURE 7) of the main drive shaft 73 acting on a roller 245 of the driver lever 241. The forward restoring movement of the multiplier indexing slide 237 (FIGURE 8) on each multiplying machine cycle is accomplished through the urging of a spring 247 (FIGURE 8), the forward end of which is attached to a shaft 251.

The rearward spring-urged movement of the multiplier indexing slide 213 (FIGURE 11) also conditions the machine to non-print the second factor as this factor is added and subtracted during the various multiplying machine cycles, after the second factor has once been printed on the first cycle following depression of the multiplier-entering motor bar 193. This non-print conditioning is accomplished through the releasing action of a rearwardly moving stud 253 of the indexing slide 213 on a non-print slide 255 and a stud 257 of a non-print pawl 261. The printing of the second multiplying factor during the first machine cycle following depression of the multiplier-entering motor bar 193 is accomplished, despite the releasing action of the stud 253 and the non-print slide 255 on the non-print pawl 261, since the non-print pawl 261 is retained in its forward non-blocking position during this first machine cycle by a projection 263 of a double-hooked bail 265. Continued engagement of the two upwardly extending hooks of the double-hooked bail 265 with a horizontal shaft 267 connecting the carriage driver levers 271 is accordingly provided, during this cycle, and printing of the second factor is accomplished as the driver levers 271 and the double-hooked bail 265 are activated in unison by the cams 273 to impact a platen 277 against a ribbon and rearwardly positioned type bars. As the second factor is printed during this first cycle, the upward rocking of the double-hooked bail 265 causes the projection 263 to be elevated above its contact position with the non-print pawl 261. The released pawl 261 is accordingly permitted to be rocked clockwise by a spring 259 so that its rearward horizontal surface is located in the downwardly returning path of the projection 263 of the double-hooked bail 265 to disengage the upright hooks of this bail from the shaft 267 as the carriage assembly completes its downwardly restoring movement. With the non-print pawl 261 located in this blocking position with the projection 263, the double-hooked bail 265 is held disengaged from the horizontal shaft 267 during all ensuing automatic machine cycles that are involved in the multiplying process. The upward rocking of the horizontal shaft 267 on each machine cycle is therefore not transmitted to the outer carriage assembly 275 to effectuate the printing of partial products.

The spring-urged rearward movement of the multiplier indexing slide 213, when released by depression of the multiplier-entering motor bar 193, also activates keyboard blocking means to prevent depression of the numerical keys 21 during multiplying machine cycles. This blocking action is accomplished through the counter-clockwise rocking of a link 285 and a shaft 283 (FIGURE 13) which activates a keyboard blocking slide 293 rearwardly through a downwardly extending link 295 and a stud 291. With the keyboard blocking slide 293 positioned rearwardly, an elevated surface on its forward extremity is located in blocking position with a projection 297 (FIGURES 3B and 12) of conventional keyboard blocking means to prevent the depression of the numerical keys 21.

Depression of the conventional operating keys in columns 301 and 302 (FIGURE 1) of the keyboard is prevented during multiplying machine cycles through the conventional slides 303 and 305 (FIGURE 3B) which are activated rearwardly by the clockwise rocking of the drive trip shaft 83. The clockwise rocking of the drive trip shaft 83 is also effectuated by the spring-urged rearward movement of the multiplier indexing slide 213, as hereinafter described. The multiplicand-entering motor bar 23 (FIGURE 1) is blocked against depression during multiplying machine cycles following depression of the multiplier-entering motor bar 193 by means of the floating interlock 191 (FIGURE 4), which was described in the preceding section.

The spring-urged rearward movement of the multiplier indexing slide 213 (FIGURE 11), upon depression of the multiplier-entering motor bar 193, likewise activates conventional means for disabling pin carriage restoration during the second half of a machine cycle. This disabling is accomplished by the camming action of a diagonal surface 307 (FIGURE 10) of the multiplier indexing slide 213 upon a stud 311 of a disabling lever 313. This camming action serves to rock the disabling lever 313 counter-clockwise to activate conventional means for disabling pin carriage restoration. Due to this disabling of pin carriage restoration, the second multiplying factor is retained in the pin carriage 187 (FIGURE 5) throughout the multiplying process, during which process the amount is either additively or subtractively accumulated in the totalizer on succeeding machine cycles according to the forward displaced positioning of the storing elements 27 as previously mentioned and as detailed hereinafter.

Figures 10, 11:
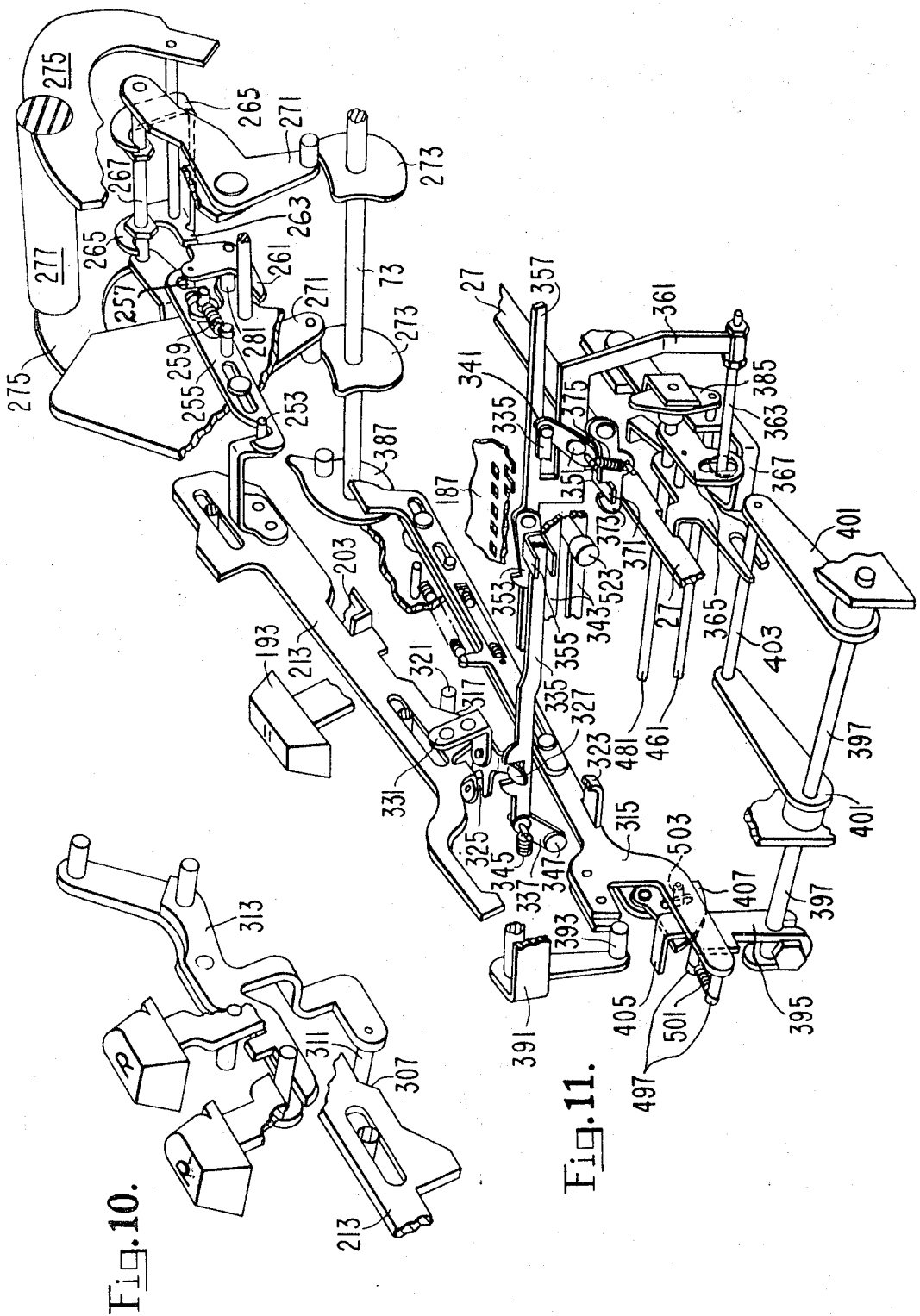
FIGURE 10 is a right front fragmentary perspective of repeat mechanism details.
FIGURE 11 is a partial right front perspective showing details of the cipher indexing and selective printing mechanisms.

Rearward movement of the multiplier indexing slide 213 (FIGURE 11), upon depression of the multiplier-entering motor bar 193, also releases a cipher indexing slide 315 which remains in released condition throughout the multiplying process to enable activation of pin carriage escapement means whenever the computations required by a given forwardly displaced storing element 27 are completed. Release of the cipher indexing slide 315 is accomplished by the camming action of a diagonal surface 317 (FIGURES 7 and 11) of the multiplier indexing slide 213 on a stud 321 of a cipher release latch 323 (FIGURE 7). The lower outwardly extending projection of the cipher release latch 323 is thereby disengaged from a cut-out in the lower surface of the cipher indexing slide 315 (FIGURE 11). Operation of the cipher indexing slide 315 to produce one unit of escapement of the pin carriage and a corresponding one column shift of the sensing and cycle counting device 360 (FIGURE 2) is described in the following section.

The rearward spring-urged movement of the multiplier indexing slide 213 (FIGURE 11), upon depression of the multiplier-entering motor bar 193, serves also to couple the sensing and cycle counting device 360 (FIGURE 2) with the pin carriage 187 (FIGURE 11) throughout the various multiplying machine cycles, so that this device, through operation of the cipher indexing slide 315, may be moved transversely from one denominational order of the storing elements 27 to the adjoining storing element to the left whenever the additions and subtractions required by the forward displaced positioning of a given storing element are completed.

Coupling of the sensing and cycle counting device 360 (FIGURE 2) with the pin carriage 187 (FIGURE 11) is accomplished by the rearward movement of a stud 325 on an outwardly extending offset projection of the multiplier indexing slide 213. This stud 325 is engaged with a slot in a pivoting lever 327 which is attached by means of an angular bracket 331 to a side frame 333 (FIGURE 7). A forwardly extending projection of the pivoting lever 327 (FIGURE 11) is engaged with a cut-out in a coupling slide 335, thereby causing the coupling slide 335 to be shifted leftwardly as the stud 325 moves rearwardly with the indexing slide and as the pivoting lever 327 is rotated clockwise. Since the short arms 337 and 341 are pivotally attached to a stationary member 343, the leftward shifting of the coupling slide 335, as facilitated by a spring 345, is accompanied also by the upward movement of the slide 335 as the short arms 337 and 341 rotate counterclockwise around their pivoting points 347 and 351, respectively. This upward movement of the coupling slide 335 causes the clockwise rotation of a coupling pawl 353 through the rising action of a channel 355 which is attached to the coupling pawl and through which the coupling slide 335 transversely moves during its leftward shifting motion. The clockwise rocking of the coupling pawl 353 is effective to engage the pawl with one of several cutouts in the pin carriage 187 where it remains throughout the various multiplying machine cycles.

Since the coupling pawl 353 is pivotally attached to a horizontal member 357 of the sensing and cycle counting device 360 (FIGURE 2), the latter device is conditioned to be shifted to the left each time the pin carriage 187 (FIGURE 11) is permitted one unit of leftward escapement. A vertical member 361, a movable shaft 363, a sensing projection 365, and a storing element moving pawl 367, which comprise the sensing and cycle counting device, are accordingly shifted to the left whenever the pin carriage is stepped to the left, to bring the sensing projection 365 and the storing element moving pawl 367 into alignment with the adjoining storing element 27 to the left.

The leftward shifting of the coupling slide 335, in addition to coupling the sensing and cycle counting device 360 (FIGURE 2) with the pin carriage 187 (FIGURE 11), also unlocks the former device from its rightmost home position where it is retained during non-multiplying machine operations by the engagement of a stationary latch pawl 373 with a forwardly extending projection 371 of the horizontal member 357. The unlatching of this pawl and projection is accomplished through the counterclockwise rocking of the short arm 341 as the coupling slide 335 is shifted leftwardly in a manner previously described. During the counterclockwise rocking of the short arm 341, a lower extension of this arm cams the latch pawl 373 counterclockwise against the bias of a spring 375 to lower the latch pawl to its unlatched position. With the latch pawl 373 disengaged from the projection 371, the moving pawl 367 and the sensing projection 365 are permitted free leftward movement corresponding to the leftward escapement of the pin carriage.

The spring-urged rearward movement of the multiplier indexing slide 213, upon depression of the multiplier-entering motor bar 193, also initiates automatic machine cycling through contact of the forward hooked projection of the slide 213 with an adjustable stud 377 (FIGURE 3B) of an arm 381 attached to the drive trip shaft 83. The resulting clockwise rotation of the drive trip shaft 83, as the multiplier indexing slide 213 moves rearward, causes the arm 91 (FIGURES 3B and 15) to move the blocking arm 93 (FIGURE 15) forward to release the intermediary latch arm 95 and the latch arm 103 to permit the spring-urged rearward movement of the drive trip slide 107 to activate a conventional drive trip mechanism as previously described. Since the multiplier indexing slide 213 (FIGURE 3B) is retained in its rearward activated position throughout the multiplying process, the drive trip shaft 83 is retained in its activated clockwise rocked position throughout the ensuing series of automatic machine cycles. This series of multiplying cycles is terminated by a cycle terminating device, hereinafter described, when the additions and subtractions called for by the leftmost forwardly displaced storing element 27 have been completed.

Subsequent to entering the multiplicand or first factor by means of the multiplicand-entering motor bar 23, and entering the multiplier or second factor through depression of the multiplier-entering motor bar 193, the various functions of the multiplier indexing slide 213 having been indexed, the machine will continue to operate under the control of the sensing and cycle counting device 360 (FIGURE 2) and a cycle controlling device in cooperation with the forwardly displaced storing elements 27 in a manner described in the following section.

Control over short-cut multiplication

Automatic control over short-cut multiplication is provided through a sensing and cycle counting device, a cycle controlling device, and a cycle termination device, all three of which cooperate with the first factor storing elements 27 during multiplying machine cycles. Pertinent to the functioning of these devices are: the multiplier sensing slide 237 (FIGURES 2 and 8); the storing element moving pawl 367 (FIGURES 2, 5 and 11); a reversible drive member 383 (FIGURE 9); a driving means 385; the sensing projection 365 (FIGURES 2, 5 and 11); a cipher indexing mechanism comprising a cam 387 (FIGURE 11), the cipher indexing slide 315, a cipher indexing bail 391, an upright arm 395 of a "0–10" sensing shaft 397, the arms 401 attached to the sensing shaft 397, a shaft 403 connecting the arms 401 which operates in a slot of the sensing projection 365, and a limit wedge 407 which cooperates with the cipher indexing slide 315; a cross-lying sensing bail 225 (FIGURES 2 and 5) attached to the shaft 411 and the bail lever 223 (FIGURES 2, 4 and 7); the storing elements 27 (FIGURES 2 and 5); and the storing element carry pawls 155.

The storing elements 27 (FIGURE 5) are so constructed as to enable the cooperation therewith of the above-listed parts and mechanisms. The teeth 27A on the upper forward sections of the storing elements 27 are effective to displace the storing elements forwardly from their home positions to receive the digit values of the first multiplying factor. These teeth 27A, along with corresponding teeth disposed on the forward ends of the type bars 127, are meshed with the pinions 161 during the first half of a multiplicand-entering machine cycle, to move the storing elements 27 forwardly a distance corresponding to the forward restoring movement of the type bars following the printing of the first factor.

The notches 27B on the upper rear sections of the storing elements 27 are engaged by the finger springs 195 which apply variable retentive tension against the storing elements. This retentive tension reaches its maximum when the storing element restoring shaft 143 is located in its forward home position. Minimal retentive tension is applied during the clearing of the storing elements early in the first half of a multiplicand-entering cycle as the restoring shaft 143 moves rearward to restore forwardly displaced storing elements to their rearward home positions.

The shallow notches 27C in the lower center sections of the storing elements 27 are engageable by the storing element moving pawl 367 during each multiplying machine cycle. These shallow notches, which correspond to digit values 1 through 5 of the first multiplying factor, provide a lower sensing limit for the moving pawl to effectuate the additive accumulation of the stored second factor and to produce one unit of rearward restoring movement to individual storing elements 27. The rearward restoring movement of an individual storing element is accomplished through operation of the driving means 385 (FIGURE 9) and the reversible drive member 383, as hereinafter described.

Deeper notches 27D (FIGURE 5) in the lower center sections of the storing elements 27 are also engageable by the storing element moving pawl 367 during each multiplying machine cycle. These deeper notches, which correspond to digit values 6 through 9 of the first factor, provide the moving pawl 367 with a higher level sensing limit to effectuate the subtractive accumulation of the stored second factor and to provide individual storing elements with one unit of forward advancing movement. This forward advancing movement is also accomplished through operation of the driving means 385 (FIGURE 9) and the reversible drive member 383.

Two flat notches 27E (FIGURE 5) in the lower edge of each storing element 27 are engageable by the sensing projection 365 of a cycle controlling device when a storing element 27 is restored or advanced to its home or forward advanced positions. Engagement of this sensing projection 365 with a flat notch 27E in a given storing element 27 is effective to activate a cipher indexing mechanism to shift the storing element moving pawl 367 and the sensing projection 365 into functional alignment with the adjoining storing element to the left, as hereinafter described. The more forwardly of the two flat notches 27E is engaged by the sensing projection 365 when the respective storing element has been restored rearwardly to its home position, such notch accordingly being referred to as the "0" notch. The more rearward notch is engaged by the sensing projection 365 when the respective storing element has been advanced to its full forward advanced position such notch being referred to as the "10" notch.

A pivoting arm 27F attached to each storing element 27 provides a contact surface for the storing element moving pawl 367 when a given storing element is located in its "0" or "10" position when first sensed by the moving pawl 367. This contact of the moving pawl against a lower extension of the pivoting arm 27F is effective to rock the pivoting arm 27F either counterclockwise or clockwise depending upon whether the storing element is in its "0" or "10" position at the time of contact. A non-add operation is effectuated in either event through a shaft 413 (FIGURES 2 and 5) and related linkage.

Flat notches 27G (FIGURE 5) in the upper edges of the storing elements 27 are engaged by the cross-lying sensing bail 225 (FIGURES 2 and 5) of a cycle terminating device when all storing elements 27 are located in their "0" or "10" positions. This engagement permits the spring-urged clockwise rocking of the shaft 411 and the bail lever 223 (FIGURES 2 and 7) to activate a restoring pawl 415 (FIGURE 7) which terminates automatic machine cycling through restoration of the multiplier indexing slide 213.

The offset leftwardly extending projections 27H (FIGURE 5) on the rearmost extremities of the storing elements 27 provide contact with the rightwardly extending projections 155A on the immediately adjoining storing element carry pawls 155 to the left when the storing elements 27 are advanced forwardly past their "8" positions. This contact of the offset projection 27H of a given storing element is effective to transmit one unit of advancing movement to the adjoining storing element to the left when the given storing element is advanced from its "9" to its "10" position, the given storing element having been effective to produce subtractive accumulations through the cooperation of the storing element moving pawl 367 with deeper notches 27D of the given storing element.

Notches 27-I on the lower edge of each storing element 27 are engageable by a spear-shaped projection 155B of a corresponding storing element carry pawl 155 when such carry pawl has been tripped by the offset projection 27H of the adjoining storing element 27 to the right. This engagement of the spear-shaped projection 155B with the notches 27-I on a given storing element 27 is effective to provide the given storing element with one unit of advancing movement as the adjoining storing element to the right is advanced from its "9" to its "10" position.

The storing element carry pawls 155 are pivotally attached to a shaft 417 (FIGURE 5) and normally retained by the urging of the springs 421 against a locating shaft 423 and a latch plate 425. As the leftwardly extending projecttion 27H of a given storing element 27 contacts the offset projection 155A of a storing element carry pawl 155 associated with the leftwardly adjoining storing element 27, the contacted carry pawl 155 is moved forwardly against the tension of its spring 421 to an unlatched position with the latch plate 425. The spring 421 serves to pivot the unlatched carry pawl counterclockwise around its pivoting point 427 to cause the spear-shaped projection 155B to be moved upwardly into engagement with a notch in the notched area 27-I of its corresponding storing element 27. One unit of forward advancing movement is accordingly transmitted to the corresponding (or leftwardly adjoining) storing element as the given storing element is moved forwardly by the storing element moving pawl 367 to its "10" position.

The forwardly extending tails on the storing element carry pawls 155 are contacted by the shaft 153 (FIGURES 5 and 15) during the early portion of a multiplicand-entering cycle when the levers 151 (FIGURE 15) are cammed downward by the storing element restoring shaft 143, as the restoring shaft 143 is activated rearwardly to restore forwardly displaced storing elements to their rearward home positions. The forwardly extending tails of tripped and forwardly advanced storing element carry pawls 155 are also contacted by a resetting bail 431 (FIGURES 2 and 5) as the multiplier sensing slide 237 (FIGURE 8) is activated rearwardly on each multiplying machine cycle. Rearward movement of the sensing slide 237 is effective, as hereinafter described, to relatch tripped and forwardly advanced carry pawls 155 (FIGURE 5) through the counterclockwise rocking of the resetting bail 431. The clockwise rocking of tripped and forwardly advanced storing element carry pawls 155, whether activated by the shaft 153 or the resetting bail 431, effectuates the relatching of the carry pawls with the latch plate 425, through the rearward urging of the respective springs 421.

The multiplier sensing slide 237 (FIGURE 8) is supported by the shafts 433 and 435, and is longitudinally movable during each multiplying machine cycle following depression of the multiplier-entering motor bar 193 (FIGURE 6) upon second factor entry. As previously described, the spring-urged rearward movement of the multiplier indexing slide 213 (FIGURE 7) is effective to couple this sensing slide 237 (FIGURE 8) with the driver lever 241. The sensing silde 237 is accordingly cam-activated rearwardly on each multiplying cycle by the action of the cam 243 (FIGURE 7) on the roller 245, and restored forwardly upon completion of each cycle by the spring 247 (FIGURE 8) attached to the shaft 251.

A diagonal surface 237A of the multiplier sensing slide 237 is effective to rock the resetting bail 431 (FIGURE 5) counterclockwise through contact with a roller 437 (FIGURE 8) as the sensing slide 237 is cam-driven rearward. Tripped and forwardly advanced storing element carry pawls 155 (FIGURE 5) are thereby restored to latched position through contact of the bail 431 with the forwardly extending tails of the storing element carry pawls, as previously described.

A roller 441 (FIGURE 8) of a sensing lever 443 is contacted by a blocking slide 445, as the multiplier sensing slide 237 is cam-driven rearward. The blocking slide 445 is accordingly held stationary by the roller 441 to effectuate the opening of a cut-out 237B in the sensing slide 237. Continued rearward movement of the multiplier sensing slide 237 permits the roller 441 of the sensing lever 443 to enter the cut-out 237B through the urging of the springs 457 (FIGURE 5). The roller 441 (FIGURE 8) is limited in its upward movement either by the uppermost surface of the cut-out 237B or by a lower limit as hereinafter explained. The sensing lever 443 is rigidly attached to a shaft 451 (FIGURES 2, 5 and 8), as are the two interior arms 453 (FIGURES 2 and 5) the forward extremities of which are connected by a shaft 455 which rides in a slot in the storing element moving pawl 367 (FIGURE 5).

As the shaft 455 moves upward during a multiplying cycle, as urged by the springs 457 and enabled by the entry of the roller 441 (FIGURE 8) into the cut-out 237B, the storing element moving pawl 367 (FIGURE 5) is pivoted clockwise on a shaft 461 (FIGURES 2 and 5) to thereby engage either a shallow or deeper notch 27C or 27D (FIGURE 5) of a given storing element 27. When a shallow notch 27C, corresponding to a digit value of from 1 through 5 of the multiplicand, is positioned in the path of the upward-moving storing element moving pawl 367, the upward limit of the shaft 455 and the roller 441 (FIGURE 8) of the sensing lever 443 is provided by contact of the upright projection of the moving pawl 367 (FIGURE 5) against the upper surface of the shallow notch 27C. When a deeper notch 27D, corresponding to a digit value of from 6 through 9 of the multiplicand, lies in the upward moving path of the storing element moving pawl 367, the upward limit of the shaft 455 and the sensing lever 443 (FIGURE 8) is provided by contact of the roller 441 with the upper surface of the cut-out 237B of the multiplier sensing slide 237.

When the upward movement of the shaft 455 (FIGURE 5) and the sensing lever 443 (FIGURE 8) is limited by a shallow notch 27C (FIGURE 5), the forward extremity of the sensing lever 443 (FIGURE 9) is prevented from contacting a roller 463 on the outer surface of the reversible drive member 383. The reversible drive member 383 is accordingly permitted horizontal alignment with an outer extension of the shaft 461 on which the storing element moving pawl 367 is pivotally attached. When, however, the upward movement of the shaft 455 and the sensing lever 443 is limited by contact of the roller 441 (FIGURE 8) against the upper surface of the cut-out 237B, the forward extremity of the sensing lever 443 (FIGURE 9) contacts the roller 463 to pivot the reversible drive member 383 counterclockwise on a shoulder stud 477. The counterclockwise rocking of the reversible drive member 383 is effective to align the upper vertical surface of this member 383 with a stud 467 of the driving means 385.

Subsequent to the positioning of the reversible drive member 383, as above described, a diagonal surface 237C (FIGURE 8) contacts a short shaft 471 (FIGURE 8) to rock a bellcrank 473 clockwise on a shaft 475 to activate the reversible drive member 383 rearwardly. During this rearward activation, the shaft 461, on which the storing element moving pawl 367 is pivotally attached, is activated either rearwardly or forwardly depending upon whether the reversible drive member 383 is aligned with the shaft 461 or with the stud 467, as determined by the upward limit of the shaft 455. When the upward movement of the shaft 455 is limited by contact of the moving pawl 367 with a shallow notch 27C (FIGURE 5), the rearward movement of the reversible drive member 383 (FIGURE 9) will activate the shaft 461 and the moving pawl 367 rearwardly to exert a rearward restoring push against the adjoining tooth of the shallow notch 27C (FIGURE 5), to provide the active storing element 27 with one unit of rearward restoring movement. When however, the reversible drive member 383 (FIGURE 9) is aligned with the stud 467 of the driving means 385, such alignment being permitted by the engagement of the moving pawl 367 with a deeper-notch 27D (FIGURE 5), the rearward movement of the reversible drive member 383 (FIGURE 9) will activate the shaft 461 and the moving pawl 367 forwardly to exert a forward advancing pull against the adjoining tooth of the deeper notch 27D (FIGURE 5), to provide the active storing element 27 with one unit of forward advancing movement.

As the multiplier sensing slide 237 (FIGURE 8) nears the rearmost point in its cam-activated rearward movement, a diagonal surface 237D contacts the roller 441 of the sensing lever 443 to cam the roller 441 out of the cut-out 237B. The blocking slide 445 is accordingly activated rearward on the sensing slide 237 by the spring 447 to close the cut-out 237B and to thereby prevent the re-entry of the roller 441 into the cut-out during the spring-activated forward restoring movement of the multiplier sensing slide 237.

During non-multiplying machine operations, the short shaft 233 is permitted to idle in the horizontal slot of the multiplier sensing slide 237, to render the sensing slide 237 and the storing element moving pawl 367 (FIGURE 9) inoperative.

In addition to the above-described cooperation of the storing element moving pawl 367 (FIGURE 5) with the shallow notches 27C and the deeper notches 27D to provide a given storing element with one unit of rearward restoring or forward advancing movement, the storing element moving pawl 367 also cooperates with conventional machine controls to produce both subtract and non-add operations. When the shaft 455 is permitted full upward movement by the engagement of the moving pawl 367 with a deeper notch 27D, the shaft 451 is permitted maximum clockwise rotation (as viewed in FIGURE 15) to thereby effectuate a subtractive accumulation of the stored second factor in the totalizer through activation of a lever 483, a stud 485, and a lever 487 which operates conventional subtract linkage. When a given storing element 27 (FIGURE 5) is located in either its rearward home or full advanced position at the time it is initially sensed by the storing element moving pawl 367, the upward movement of the moving pawl 367 is effective to rock a shaft 413 and a lever 491 counterclockwise through either the counterclockwise or clockwise rocking of the associated pivoting arm 27F. The counterclockwise rocking of the lever 491 causes an outwardly extending stud 493 disposed thereon to be rocked clockwise (as viewed in FIGURE 15), to thereby rock the bail lever 495 counterclockwise to activate conventional means for producing non-add operations.

The sensing projection 365 (FIGURES 5 and 11) is pivotally attached to a shaft 481 and so cradled between a U-shaped portion of the storing element moving pawl 367 (FIGURE 11) as to be transversely movable on the shaft 481 as the moving pawl 367 is transversely movable on the shaft 461. Both of these transverse movements are controlled by the transverse movement of the vertical member 361 and the movable shaft 363 in conjunction with the step-wise movement of the pin carriage 187, as described in a preceding section. A slot in a forward extremity of the sensing projection 365 cooperates with a shaft 403 connecting the two interior arms 401 which are rigidly attached at their forward extremities to the "0–10" sensing shaft 397.

Figure 3B:
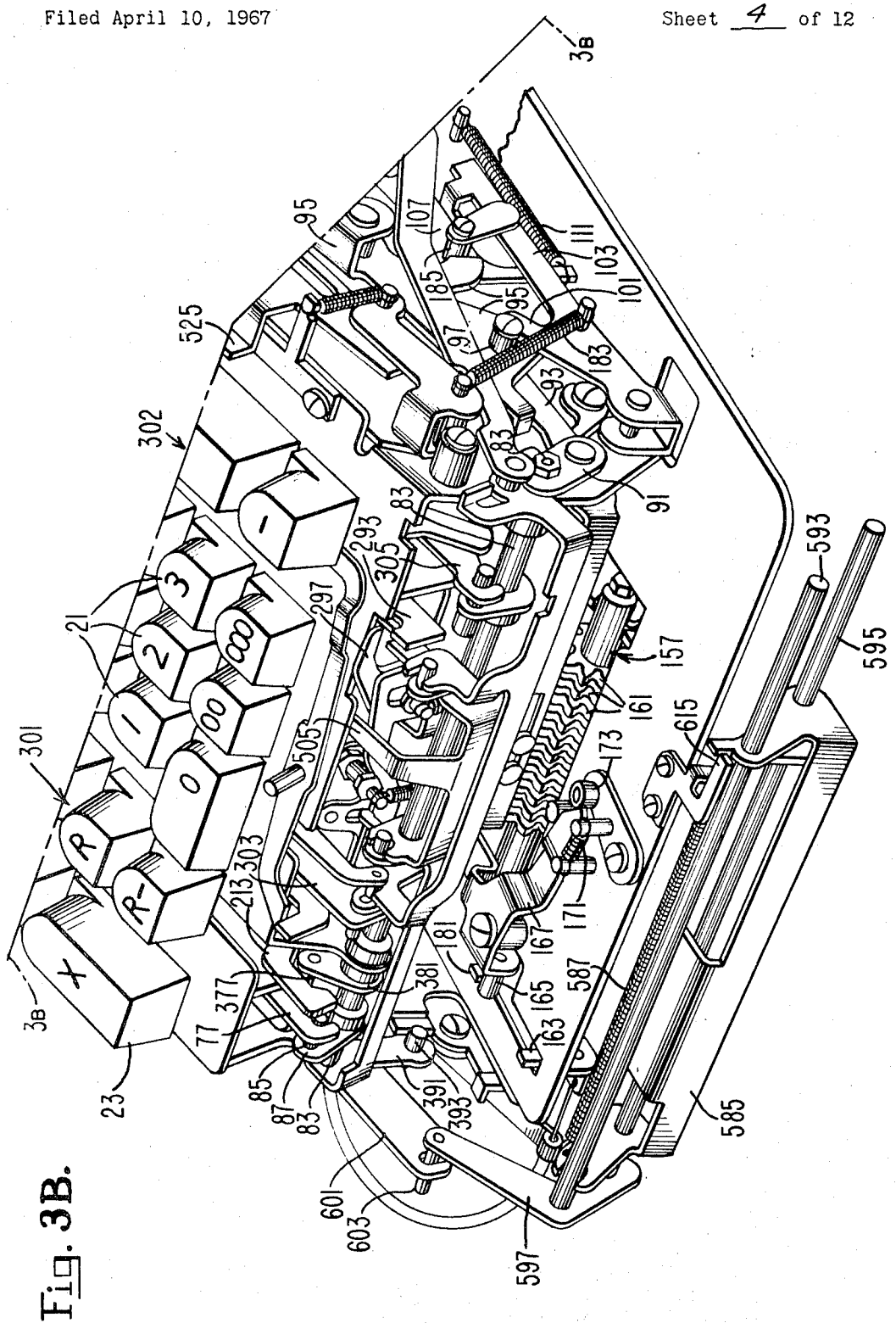
FIGURE 3B is a partial perspective taken from the right front corner and separated at line 3B.

During the second half of each multiplying machine cycle, a stud on the cam 387 of the main drive shaft 73 activates the cipher indexing slide 315 forwardly, this slide having been released by the cipher release latch 323 during the rearward spring-urged movement of the multiplier indexing slide 213 as previously described. The cam-activated forward movement of the cipher indexing slide 315 exerts a forward pull on the upright arm 395 of the "0-10" sensing shaft 397, through the action of the studs 497 and a spring 501. This forward pull on the upright arm 395 causes the "0-10" sensing shaft 397 to be rocked in a counterclockwise direction according to the upward rocking movement that is permitted the shaft 403 by the upward limit of the sensing projection 365. When the sensing projection 365 is limited by the lower surface of a given storing element 27, the shaft 403 is provided with an earlier upward limit to minimize the counterclockwise rotation of the "0-10" sensing shaft 397. The upright arm 395 is thereby deprived of sufficient forward movement to permit clearance of the limit wedge 407 to the rear of an offset projection 405, as a stud 503 attached to the cipher indexing slide 315 strives to rock the limit wedge 407 clockwise through engagement with a slot in the limit wedge. Due to the consequent trapping action of the offset projection 405 against the upper surface of the limit wedge 407, the stud 503 serves to limit the forward movement of the cipher indexing slide 315 to thereby prevent contact of the slide 315 with a stud 393 of the cipher indexing bail 391. Activation of a conventional pin carriage escapement mechanism is accordingly prevented. When, however, the sensing projection 365 engages either the foremost or rearmost flat notch 27E (FIGURE 5) of a given storing element 27, the "0-10" sensing shaft 397 (FIGURE 11) is permitted additional counterclockwise rocking to enable sufficient forward movement of the upright arm 395 and the offset projection 405 to release the limit wedge 407. Clearance of the limit wedge 407 to the rear of the offset projection 405 enables full clockwise rocking of the limit wedge 407 and additional forward movement of the cipher indexing slide 315. The cipher indexing bail 391 is accordingly rocked through contact of the slide 315 with the stud 393, to thereby activate conventional pin carriage escapement means through the downward rocking of the rearwardly extending projection 505 (FIGURES 3B and 12).

As indicated in a preceding section, the coupling pawl 353 (FIGURE 11) is engaged with a cut-out in a conventional pin carriage 187 during multiplying machine cycles to effectively couple the storing element moving pawl 367 and the sensing projection 365 with the pin carriage, through the horizontal member 357, the vertical member 361 and the movable shaft 363. The downward rocking of the rearwardly extending projection 505 (FIGURE 3B) of the cipher indexing bail 391 accordingly produces one unit of pin carriage escapement and effectuates a one unit leftward shift of the moving pawl 367 (FIGURE 11) and the sensing projection 365, so that the pawl 367 and the projection 365 are thereafter aligned with the leftwardly adjoining storing element 27. Following a pin carriage escapement and a leftward shift of the sensing and cycle counting device 360 (FIGURE 2), the moving pawl 367 (FIGURE 11) and the sensing projection 365 cooperate with the leftwardly adjoining storing element 27 to effectuate the additions and subtractions that are required by the forward displaced positioning of this storing element.

When all storing elements 27 have been restored or advanced to their "0" or "10" positions, respectively, the cross-lying sensing bail 225 (FIGURES 2 and 5) of a cycle terminating device, through the downward urging of the spring 221 (FIGURE 7), engages either the foremost or the rearmost flat notches 27G (FIGURE 5) of the various storing elements 27, to thereby permit the clockwise rotation of the supporting shaft 411 (FIGURES 2, 5 and 7) and the bail lever 223 (FIGURES 2 and 7) attached to the leftmost extremity of the shaft 411. An arm 507 (FIGURE 7) disposed uprightly above a stud 509 extending outwardly from the rear extremity of the bail lever 223 is thereby elevated to effectuate the clockwise rocking of a restoring pawl 415 through a stud 511. The restoring pawl 415 is pivotally attached to the outer surface of the multiplier indexing slide 213. Clockwise rocking of the pawl 415 is effective to position the rearmost surface of the pawl into the forward moving path of a roller 513 attached to the upper arm of a driver lever 515. During the second half of a multiplying cycle in which the restoring pawl 415 is so positioned, the multiplier indexing slide 213 is restored forwardly to home position through the clockwise rocking of the driver lever 515 by a cam 521 acting on a roller 517. As previously described, the sensing of the cross-lying sensing bail 225 (FIGURE 5) for the flat notches 27G is initiated upon depression of the multiplier-entering motor bar 193 (FIGURE 1), when the offset link 217 (FIGURE 7) attached to the forward end of the bail lever 223 is spring-urged downwardly as permitted by the clockwise rocking of the latching lever 205 by the lowering of the latch plate 203. The forward restoring movement of the multiplier indexing slide 213 is effective to terminate multiplying machine cycles as hereinafter described.

Having described the various parts and mechanisms comprising the improved means for controlling short-cut multiplication, the following paragraphs are devoted to a description of the multiplying process itself, with particular attention to the sequence in which the various denominational orders of the storing elements 27 are called into play.

At the beginning of a multiplying computation, the storing element moving pawl 367 (FIGURE 2) of a sensing and cycle counting device and the sensing projection 365 of a cycle controlling device are aligned with the rightmost first factor storing element 27. This pre-set positioning of these devices was provided by the rightward movement of a roller 523 (FIGURE 11) of the pin carriage 187 as the pin carriage was restored rightwardly through conventional means upon the conclusion of the preceding multiplication. This preceding rightward movement of the roller 523 was effective, through contact with a vertical surface of the horizontal member 357, to restore the member 357, the vertical member 361, the movable shaft 363, the sensing projection 365 and the storing element moving pawl 367 to their rightmost positions where they were secured by engagement of the latch pawl 373 with the forwardly extending projection 371 of the horizontal member 357.

During the first machine cycle of a multiplying computation the storing element moving pawl 367 (FIGURE 5) is activated upwardly through the urging of the springs 457 as the roller 441 (FIGURE 8) is permitted entry into the cut-out 237B by the cam-activated rearward movement of the multiplier sensing slide 237.

When the upward movement of the storing element moving pawl 367 (FIGURE 5) is limited by a shallow notch 27C of the rightmost storing element 27, the stored second factor is additively accumulated in the totalizer through conventional means, and the driving means 385 (FIGURE 9) is rotated clockwise by contact of the reversible drive member 383 with the shaft 461 as the reversible drive member is activated rearwardly by the diagonal surface 237C acting on the short shaft 471. Clockwise rocking of the driving means 385 is effective to move the shaft 461 and the moving pawl 367 rearwardly to apply one unit of rearward restoring movement to the rightmost storing element 27. This rearward restoring movement is effectuated by contact of the upright projection of the moving pawl 367 (FIGURE 5) against the vertical surface of the rearwardly adjoining tooth of the shallow notch 27C. On succeeding automatic machine cycles, the moving pawl 367 continues to sense the shallow notches 27C to produce additional additive accumulations of the stored second factor and to exert additional units of rearward restoring movement to the rightmost storing element 27, until on a given machine cycle the rightmost storing element 27 is restored to its home or "0" position.

When the upward movement of the storing element moving pawl 367 is limited by contact of the roller 441 (FIGURE 8) against the upper surface of the cut-out 237B of the sensing slide 237, due to the engagement of the moving pawl 367 (FIGURE 5) with a deeper notch 27D of the rightmost storing element 27, the forward projection of the sensing lever 443 (FIGURE 9) contacts the roller 463 to rock the reversible drive member 383 counterclockwise on the shoulder stud 477. With the reversible member 383 aligned with the stud 467, the driving means 385 is rotated counterclockwise as the reversible member 383 is activated rearward by the action of the diagonal surface 237C on the short shaft 471. Counterclockwise rotation of the driving means 385 is effective to move the shaft 461 and the moving pawl 367 forwardly to apply one unit of forward advancing movement to the rightmost storing element 27 (FIGURE 5). This forward advancing movement is effectuated by contact of the moving pawl 367 against the forwardly adjoining tooth of the deeper notch 27D.

Full upward rocking of the roller 441 (FIGURE 8) to limit against the upper surface of the cut-out 237B also effectuates maximum rocking of the shaft 451 and the attached lever 483 (FIGURE 15) to produce a subtractive accumulation of the stored second factor in the totalizer. A subtractive accumulation is produced by conventional means when acted upon by the clockwise rotation of the lever 483 and the subtract lever 487. On succeeding automatic machine cycles, the moving pawl 367 (FIGURE 5) continues to sense deeper notches 27D in the rightmost storing element 27, to produce additional subtractive accumulations of the stored second factor and additional units of forward advancing movement of the rightmost storing element, until on a given machine cycle the rightmost element is advanced to its full advanced or "10" position. When the rightmost element is moved forwardly past its "8" position, its offset projection 27H contacts the offset projection 155A of the storing element carry pawl 155 that is aligned with the second storing element 27, to unlatch this carry pawl 155 from the latch plate 425. The spring 421 associated with this unlatched carry pawl 155 thereupon rocks the carry pawl counterclockwise so that its spear-shaped projection 155B engages a notch 27–I in the second storing element 27. With the spear-shaped projection so engaged, the first (rightmost) and second storing elements are effectively coupled together so that the second element is moved forwardly one unit of travel as the rightmost element is moved from its "9" to its "10" position.

Figure 15:
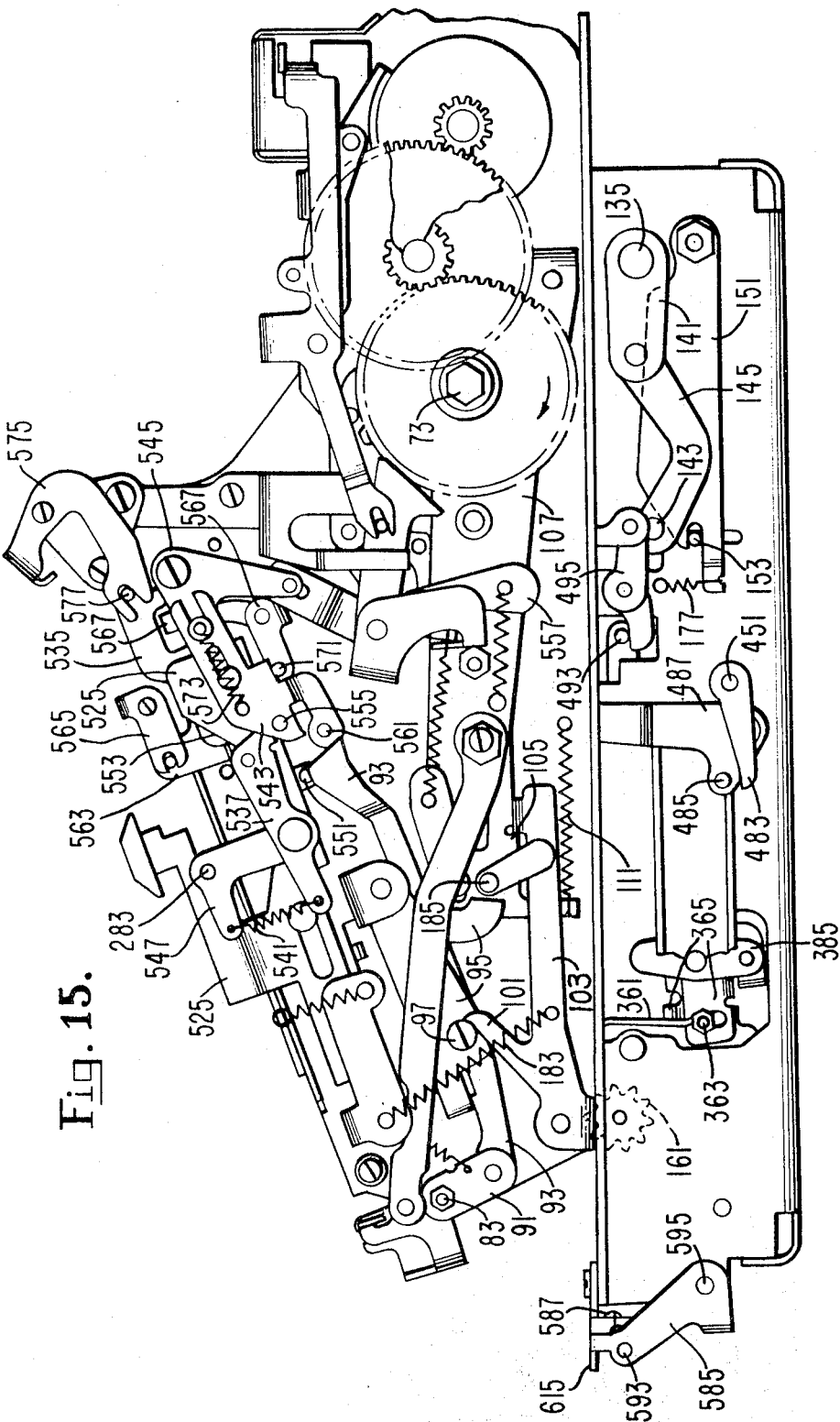
FIGURE 15 is a right side elevation showing various details of the mechanism.

When, during the initial sensing of the rightmost storing element 27, the upward spring-urged movement of the storing element moving pawl 367 provides contact with the foremost downwardly extending projection of the pivoting arm 27F attached to the rightmost storing element, the lever 491 is rotated counterclockwise through contact of the pivoting arm 27F with the shaft 413, to thereby effectuate a non-add operation through the stud 493 and the counterclockwise rotation of the bail lever 495 (as viewed in FIGURE 15). Such initial home positioning of the rightmost storing would be the result of a "0" digit in the first order of the multiplicand or first factor. Accordingly, when the least significant order of the multiplicand consists of a "0" digit, the rightmost storing element is sensed on but one machine cycle during which the stored second factor is non-added in the totalizer.

When the rightmost storing element 27 is located in either its "0" or "10" position, the sensing projection 365 (FIGURE 5) is permitted engagement with the corresponding flat notch 27E of such rightmost storing element. This engagement permits sufficient counterclockwise rocking of the "0–10" sensing shaft 397 (FIGURE 11), and sufficient forward movement of the upright arm 395, to remove the blocking limit that is normally provided the stud 503 of the cipher indexing slide 315 by the trapping of the limit-wedge 407 under the offset projection 405. Full forward movement of the stud 503 and the cipher indexing slide 315 during such machine cycle accordingly effectuates the clockwise rocking of the cipher indexing bail 391 and the lowering of the rearwardly extending projection 505 (FIGURES 3B and 12) to produce one unit of pin carriage stepwise movement. Through the coupling of the coupling pawl 353 (FIGURE 11) with the pin carriage 187, this unit of pin carriage escapement is accompanied also by a corresponding leftward shift of the storing element moving pawl 367 and the sensing projection 365 to bring this pawl and this projection into alignment with the second storing element 27.

Accordingly, the result of the engagement of the storing element moving pawl 367 (FIGURE 5) with the shallow notches 27C or the deeper notches 27D of the rightmost storing element 27, and of the consequent rearward restoring pushes against the shallow notches 27C or forward advancing pulls against the deeper notches 27D, is to produce a given number of additive or subtractive accumulations of the stored second factor in the rightmost columns of the totalizer according to the digit value of the least significant order of the first multiplying factor. When the digit value ranges from 1 through 5, a number of additive accumulations corresponding directly to such digit value are produced. When this digit value ranges from 6 through 9, a number of subtractive accumulations corresponding to the tens complement of such digit value are produced. Such series of subtractive accumulations of the stored second factor in the rightmost columns of the totalizer are accompanied by the provision for the subsequent additive accumulation of the stored second factor in next higher significant columns of the totalizer, as the additive or subtractive accumulations required by the second first factor storing element are initiated.

As the storing element moving pawl 367 and the sensing projection 365 are shifted from the rightmost storing element to the second storing element from the right, the storing element moving pawl 367 proceeds to sense the shallow or deeper notches 27C or 27D (FIGURE 5) of the second storing element 27. One notch is sensed during each succeeding machine cycle to produce additive accumulations of the stored second factor when the shallow notches 27C are sensed, and to produce subtractive accumulations when the deeper notches 27D are sensed. The moving pawl 367 applies one unit of rearward restoring push against the shallow notches 27C or one unit of forward advancing pull against the deeper notches 27D on each machine cycle, through activation of the reversible drive member 383 (FIGURE 9) and the driving means 385 by the diagonal surface 237C, until the second storing element 27 is restored or advanced to its "0" or "10" position. When this positioning is reached, the sensing projection 365 (FIGURE 11) is permitted entry into a flat notch 27E (FIGURE 5) of the second storing element, to thereby effectuate an additional unit of pin carriage escapement and an additional leftward shift of the storing element moving pawl 367 and the sensing projection 365 through operation of the "0–10" sensing shaft 397 (FIGURE 11), the cipher indexing slide 315 and the cipher indexing bail 391. The sensing projection 365 and the moving pawl 367 are accordingly brought into alignment with the next leftwardly adjoining storing element 27.

When, during the initial sensing of the second storing element 27, the upward spring-urged movement of the storing element moving pawl 367 (FIGURE 5) provides contact with the rearmost downwardly extending projection of its pivoting arm 27F, the pivoting arm 27F is rotated clockwise to elevate the shaft 413 and to accordingly produce a non-add operation through the lowering of the stud 493 and the counterclockwise rotation of the bail lever 495 (as viewed in FIGURE 15). This full advanced positioning of the second storing element would result from the initial forward displacement of the second element to "9" position (the digit value of the second order of the multiplicand being "9"), and the subsequent one position advancement of the second storing element resulting from the carry pawl (155) coupling of the first and second storing elements as the first or rightmost element is advanced from its "9" to its "10" position (the rightmost storing element having been initially displaced forwardly from home position a distance corresponding to a digit value of from "6" through "9" of the first order of the multiplicand). Accordingly, when the least significant order of the multiplicand consists of a digit value of from "6" through "9," and the second order of the multiplicand consists of a digit value of "9," the second storing element 27 will be advanced from its "9" to its "10" position through the cooperation of the storing element moving pawl 367 (FIGURE 5) with the rightmost storing element, so that, when the moving pawl 367 is shifted into cooperating position with the second storing element, the second storing element will be sensed on but one automatic machine cycle during which the stored second factor is non-added in the totalizer and the storing element moving pawl 367 and the sensing projection 365 are shifted to the left into cooperating alignment with the next leftwardly adjoining storing element 27.

This described process continues as the storing element moving pawl 367 proceeds to sense each storing element in turn from right to left to produce additive or subtractive accumulations of the stored second factor in corresponding columns of the totalizer according to whether shallow notches 27C or deeper notches 27D are sensed, and accumulating the stored second factor a given number of times corresponding to the number of restoring pushes or advancing pulls required of the storing element moving pawl 367 to restore or advance each storing element from its initially displaced position to its "0" or "10" position. The forward advancing movement of each storing element that was initially displaced to a "6" through "9" position is accompanied, when such storing element is advanced from its "9" to its "10" position, by one unit of advancing movement of the storing element to the left. Each storing element, when fully restored or advanced, permits an optimum counterclockwise rocking of the "0–10" sensing shaft 397 (FIGURE 11) through engagement of the sensing projection 365 with a flat notch 27E (FIGURE 5) on the given storing element, to thereby produce one unit of pin carriage escapement through the cipher indexing slide 315 (FIGURE 11) and related linkage, and to bring the sensing projection 365 and the moving pawl 367 into alignment with the next leftwardly adjoining storing element through their coupling with the pin carriage. These sensing, counting and cycle limiting processes continue until all the storing elements 27 have been restored or advanced to their "0" or "10" positions, at which time the additive and subtractive accumulations required of short-cut multiplication are completed with the computed result residing in the totalizer.

When all the storing elements 27 have been restored or advanced from their initially displaced positions to their "0" or "10" positions, the shaft 411 (FIGURES 2, 5 and 7) of a cycle terminating device is permitted clockwise rotation by the engagement of the cross-lying sensing bail 225 (FIGURES 2 and 5) with the foremost or rearmost flat notches 27G (FIGURE 5) of the various storing elements 27. This engagement is activated by the downward bias of the spring 221 (FIGURE 7) on the offset link 217, to thereby raise the restoring pawl 415 through related linkage, as previously described, into the path of the roller 513 of the driver lever 515. The multiplier indexing slide 213 is accordingly restored forwardly to home position on this the last multiplying machine cycle through the action of the cam 521 on the roller 517 of the driver lever 515. The forward restoration of the multiplier indexing slide 213 serves to discontinue the functional indexing that was detailed in a preceding section under the subject "Entering the Second Multiplying Factor." Discontinuances of this functional indexing results either in the machines coming to rest, when the keyboard control slide 525 (FIGURES 1, 14 and 15) is located in its forward non-automatic position, with the computed result retained in the totalizer, or in producing an additional automatic cycle after the drive trip shaft 83 (FIGURE 3B) has been released by the multiplier indexing slide 213, when the keyboard control slide 525 (FIGURES 1, 14 and 15) is located in its rearward "automatic" position. The latter additional automatic cycle is effective to print the computed result and to clear this result from the totalizer, as explained in the following section.

Although the described embodiment of this invention provides first factor storing elements which are movable rearwardly and forwardly, and provides means for restoring and advancing these elements from their initially displaced positions to satisfy the requirements of short-cut multiplication, it is not intended that the spirit and scope of the invention is to be restricted thereto. First factor storing elements comprising shallow notches 27C (FIGURE 5) only may be used, in conjunction with non-reversible driving means 385 (FIGURE 9) which is capable of moving such elements in a rearward restoring direction only. Such an embodiment would be effective to perform a multiplying operation by the repeated addition of the stored second factor, the number of additions in each instance corresponding directly to the digit values of the first multiplying factor.

Automatic or non-automatic printing of results

When the keyboard control slide 525 (FIGURE 1) is located in its rearward "automatic" position during a multiplying operation, the concluding multiplying cycle is succeeded by an additional automatic cycle during which the computed result is printed on paper tape and cleared from the totalizer. This automatic printing and clearing cycle is indexed by the forward restoration of the multiplier indexing slide 213 (FIGURE 13) during the second half of the last multiplying cycle, in cooperation with the rearward positioning of the keyboard control slide 525 (FIGURE 14). Manual rearward activation of the keyboard control slide 525 causes the inwardly extending stud 527 of this slide to be moved rearwardly out of contact with an upright projection of a stud-slide 533 to permit a spring 531 to activate the stud-slide 533 rearwardly to bring its total stud 551 into closer proximity with the forward horizontal surface of a slide 543. Rearward movement of the keyboard control slide 525 also causes a diagonal surface 553 (FIGURE 15) of this slide to be moved rearwardly out of contact with an inwardly extending stud on a latch lever 537, to permit a lower clockwise positioning of the latch lever 537 as urged by a spring 541. Both of these effects, rearward positioning of the total stud 551 and the lower clockwise positioning of the latch lever 537, must be present during the last multiplying cycle in order to index a succeeding automatic totalizing cycle.

Since the multiplier indexing slide 213 (FIGURE 13) is retained in its rearward position throughout the various multiplying cycles, as described in a foregoing section, the connecting link 285 is held in its counterclockwise rocked position by a stud 287 of the multiplier-indexing slide 213. A shaft 283 and a lever 547 on the rightmost extremity of the shaft 283 are accordingly retained in their counterclockwise rocked positions. With the lever 547 so positioned during the various multiplying cycles, the latch lever 537 (FIGURES 13 and 14) is held rearwardly so that a square stud 555, extending inwardly from the slide 543 (FIGURE 14) is engageable with the hooked portion of this latch lever 537 as the slide 543 is activated upwardly and downwardly through a bellcrank 545 and a lever 557, as the conventional drive trip slide 107 is spring-activated rearward and cam-driven forward during each of the multiplying cycles.

On the second half of the concluding multiplying cycle, the forward restoration of the multiplier indexing slide 213 (FIGURE 13) causes the connecting link 285 to be rotated clockwise through the stud 287 to thereby effectuate the clockwise rotation of the shaft 283 (FIGURES 13, 14 and 15) and the lever 547 to move the latch lever 537 forward. Forward movement of the latch lever 537 is effective, through engagement of its hooked portion with the square stud 555, to move the slide 543 (FIGURE 15) forward into vertical alignment with the total stud 551, so that the slide 543 may exert a downward push on the total stud 551 as the bellcrank 545 is rocked counterclockwise by the lever 557 as the conventional drive trip slide 107 is cam driven forward at the end of the last multiplying machine cycle. This forward movement of the slide 543 by the latch lever 537 also causes an outwardly extending stud 561 of the slide 543 to be moved into blocking contact with the offset rearward projection of the blocking arm 93, to thereby prevent the relatching of the latch arm 103 with the step 105 as the drive trip slide 107 is cam-driven forward. Relatching of the latch arm 103 with the 105 is prevented by the consequent return of the intermediary latch arm 95, following it clockwise rocking, to limit on the forward lower horizontal surface of the blocking arm 93. An additional automatic machine cycle is accordingly initiated in spite of the forward restoring movement of the multiplier indexing slide 213 (FIGURE 3B) and its resultant release of the adjustable stud 377 of the drive trip shaft 83.

The downward push of the slide 543 (FIGURE 14) on the total stud 551 effectuates the counterclockwise rocking of the stud-slide 533 and a hook-shaped lever 535 to which the stud-slide is slidably attached. A blank 563 (FIGURE 15) is thereby lowered to activate conventional total control linkage and to rock a total indication limit bail 565 counterclockwise to provide a limit for the rearward movement of the symbol type bar on the succeeding automatic totalizing cycle. The downward push on the total stud 551 and the consequent counterclockwise rocking of the hook-shaped lever 535 is also accompanied by the spring-urged clockwise rocking of a latch lever 567, to bring the upright projection of this latch lever into blocking contact with the rearmost hooked portion of the hoop-shaped lever 535, to thereby retain the hook-shaped lever in its counterclockwise rocked position until the early portion of the succeeding automatic totalizing cycle.

The clockwise rocking of the latch lever 567 also causes a stud 571 of the latch lever to be moved into blocking position with a vertical surface of the slide 543, to thereby retain the slide in its forwardly moved position when the square stud 555 is released by the latch lever 537 during the downward pushing movement of the slide 543 at the end of the concluding multiplying cycle. Upward movement of the slide 543, as the unlatched drive trip slide 107 begins its spring-urged rearward movement at the beginning of the totalizing cycle, causes this slide 543 to be released from the blocking effect of the stud 571 to enable the spring 573 to restore the slide 543 to its rearward home position. This rearward movement of the slide 543 is effective to move the outwardly extending stud 561 out of blocking contact with the offset rearward projection of the blocking arm 93, to accordingly effectuate termination of machine cycling as the drive trip slide 107 is cam-driven forward at the end of the automatic totalizing cycle. The cam-driven forward restoring movement of the drive trip slide 107, at the end of this totalizing cycle, causes the rearwardly positioned slide 543 to apply a downward push on the stud 571 of the latch lever 567, through the clockwise rocking of the lever 557 and the counterclockwise rocking of the bellcrank 545. The latch lever 567 is accordingly rotated counterclockwise to release the hook-shaped lever 535 and to permit the spring-urged clockwise restoring movement of this hook-shaped lever, and the upward restoring movement of the total stud 551.

The printing of the result of a multiplying computation is accomplished, during this automatic totalizing cycle, as a consequence of the recoupling of the double-hooked bail 265 (FIGURE 11) with the horizontal shaft 267 connecting the carriage drive levers 271. This recoupling occurs during the second half of the concluding multiplying cycle, when the multiplier indexing slide 213, through the previously described activation of the restoring pawl 415 (FIGURE 7), is restored forwardly to home position through the action of the cam 521 on the roller 517 of the driver lever 515, such forward restoring movement of the multiplier indexing slide 213 being effective through the stud 253 (FIGURE 11) to move the non-print slide 255 forward against the bias of the spring 259 to rock the non-print pawl 261 counterclockwise through the stud 257. The non-print pawl 261 is accordingly positioned forwardly of its blocking position with the projection 263 of the double-hooked bail 265. This counterclockwise rocking of the non-print pawl 261 and the recoupling of the double-hooked bail 265 with the horizontal shaft 267 during the concluding multiplying cycle serves to condition the printing mechanism to print on the succeeding machine cycle, in this case, the automatic totalizing cycle, when the cams 273 of the main drive shaft 73 activate the carriage driver levers 271 counterclockwise to provide contact of the platen 277 against the rearwardly positioned type bars through the horizontal shaft 267 and the double-hooked bail 265 of the outer carriage assembly 275.

When the keyboard control slide 525 (FIGURE 14) is located in its forward non-automatic position during a multiplying operation, the stud-slide 533 is held in its forward position against the bias of the spring 531 by the inwardly extending stud 527 of the keyboard control slide, and the latch lever 537 (FIGURE 15) is held in its counterclockwise rocked position through contact of the diagonal surface 553 with an inwardly extending stud in the rearmost portion of the latch lever 537. With the stud-slide 533 (FIGURE 14) positioned forwardly, the total stud 551 attached thereto is held forwardly and out of reach of the slide 543 as this latter slide is activated downwardly during the concluding multiplying cycle by the lever 557 and the bellcrank 545 as the drive-trip slide 107 is cam-driven forwardly. Since in this case the downward movement of the slide 543 fails to apply a downward push on the total stud 551, the hook-shaped lever 535 is not rotated counterclockwise to activate conventional total control linkage or to locate the total indication limit bail 565 (FIGURE 15) to provide a total indication limit for the symbol type bar 35 (FIGURE 6). With the latch lever 537 (FIGURE 15) held in its counterclockwise rocked position by the diagonal surface 553, the rearmost hooked portion of the latch lever 537 is held disengageable with the square stud 555 of the slide 543, so that the latter slide is not moved forwardly by the latch lever 537 as the shaft 283 and the lever 547 are rotated clockwise during the forward restoring movement of the multiplier indexing slide 213 (FIGURE 13) during the last multiplying cycle.

With the slide 543 (FIGURE 15) positioned rearwardly, the stud 561 attached thereto is retained in its non-blocking position with the offset rearmost projection of the blocking arm 93, to thereby permit the counterclockwise rotation of the drive trip shaft 83 and the spring-urged rearward movement of the blocking arm 83 as the multiplier indexing slide 213 (FIGURE 3B) is restored forwardly on the last multiplying cycle. The adjustable stud 377 of the arm 381 attached to the drive trip shaft 83 is accordingly released, and the rearward movement of the blocking arm 93 (FIGURE 15) permits the relatching of the latch arm 103 with the step 105 as the intermediary latch arm 95 comes to rest on the upper horizontal surface of the blocking arm 93. This relatching of the latch arm 103 with the step 105 is effective to terminate machine cycling as the drive-trip slide 107 is cam-driven forwardly at the end of the concluding muliplying cycle.

The subsequent printing and clearing of a computed result that is derived with the keyboard control slide 525 located in its forward non-automatic position is accomplished through the manual depression of a convention total key 529 (FIGURE 14) which activates conventional total control means and conventional means for limiting the rearward movement of the symbol type bar 35 (FIGURE 6) to print a total indication.

Chain multiplication

The result of a multiplying operation is automatically transferred to the plurality of first factor storing elements 27 (FIGURE 12) during the above-described automatic totalizing cycle, and may be transfered to the storing elements 27 upon manual depression of the conventional total key 529 (FIGURE 14) with the keyboard control silde 525 located in its rearward position, the computation having been accomplished with the keyboard control slide 525 located in its forward non-automatic position. Through this transfer of a computed result from the totalizer to the storing elements 27 (FIGURE 12), such result may be used as the multiplicand or first multiplying factor of a succeeding multiplication to provide chain multiplication.

This transfer of a computed result is accomplished, during the above-described automatic totalizing cycle, through the counterclockwise rocking of the hook-shaped lever 535 (FIGURE 15) by the downward push of the slide 543 on the total stud 551. The counterclockwise rocking of the hook-shaped lever 535 is also effective to rock a transfer bail 575 (FIGURES 4, 6, 14 and 15) clockwise through a stud 577 (FIGURES 14 and 15), to thereby raise the multiplicand activating arm 51 (FIGURES 4 and 7) through contact of a forwardly extending projection of the transfer bail 575 with a stud 581 in the upper extremity of the activating arm 51.

Upward movement of the multiplicand activating arm 51, as previously described, is effective to raise the short shaft 63 (FIGURE 4) of the pivoting arm 61 into engagement with the vertical slot in the multiplicand indexing slide 65, so that the indexing slide 65 is activated rearwardly through the cam 71, the roller 131 and the driver lever 67 during the automatic totalizing cycle. Rearward movement of the multiplicand indexing slide 65 is effective to rock the pinion locating detent lever 167 (FIGURE 6) clockwise through contact of the forward upright projection 163 with the stud 165, to thereby shift the pinion assembly 157 to the right so that the pinions 161 are engaged both with the storing elements 27 (FIGURE 12) and with the type bars 127 as the type bars are cam activated forwardly through conventional means during the first half of the totalizing cycle. The storing elements 27 are accordingly displaced forwardly from home position a distance corresponding to the digit values of the various denominational orders of the computed result. Also, as previously described, the spring-urged forward restoration of the multiplicand indexing slide 65 (FIGURE 4) during the second half of the totalizing cycle serves to rock the pinion locating detent lever 167 (FIGURE 6) in a counterclockwise direction through contact of the second upright projection 181 with the stud 165, to thereby shift the pinion assembly 157 to the left so that the pinions 161 are thereafter disengaged from the type bars 127.

The transfer of a computed result to storing elements 27 is also accomplished upon manual depression of the conventional total key 529 (FIGURE 14) with the keyboard control slide 525 located in its rearward position. The manual rearward positioning of the keyboard control slide is effective to enable the spring-urged rearward positioning of the stud-slide 533, so that an upper surface of this stud-slide, forwardly bordering a cut-out portion, lies in the downwardly moving path of a stud 583 in the conventional total key 529. Depression of the conventional total key 529 accordingly results in the counterclockwise rocking of both the stud-slide 533 and the hook-shaped lever 535. The transfer bail 575 is accordingly rocked in a clockwise direction through the stud 577 to thereby activate the multiplicand indexing slide 65 (FIGURE 4) through the activating arm 51, as previously described.

With the keyboard control slide 525 (FIGURE 14) located in its forward non-automatic position, however, depression of the conventional total kay 529 results in the printing and clearing of the computed result without transferring such result to the storing elements 27 (FIGURE 12) for subsequent use in chain multiplication. This flexibility is provided through the cut-out portion in the upper surface of the stud-slide 533 (FIGURE 14), such cut-out portion being aligned with the stud 583 of the conventional total key 529 when the stud-slide 533 is held in its forward position by the inwardly extending stud 527 of the keyboard control slide 525 when the latter control slide is located in its forward position. The total key 529 may accordingly be depressed without effectuating the counterclockwise rocking of the hook-shaped lever 535 or the transfer of the computed result through activation of the multiplicand indexing slide 65 (FIGURE 4).

Multiplying interlocks

The multiplication of two factors the total number of digits of which when added together would exceed the listing capacity of the machine is prevented by an exceed-capacity interlock which prevents full depression of the multiplier-entering motor bar 193 (FIGURE 1) when such listing capacity has been exceeded.

The described embodiment of the invention provides a listing capacity of 10 columns, and a totalling capacity of 11 columns. Although more columns could easily be provided for listing purposes, ten columns are sufficient for normal usage.

The exceed-capacity interlock comprises a slidable paddle assembly 585 (FIGURES 2, 3B and 6), a lever 597 to which are attached the shafts 593 and 595 (FIGURE 6), a multiplying release slide 601, a release bail 607 with its outwardly extending projection 605, and a rearwardly extending yielding projection 613 attached to the multiplying release slide 601.

The slidable paddle assembly 585 comprises a cross-lying member which includes a wide rearwardly extending projection and two upright extensions which are slidable on the horizontal shafts 593 and 595 attached to the lever 597. A spring 587 attached to the leftmost upright extension of the assembly and to a stationary projection 615 urges the slidable paddle assembly 585 rightwardly while a flexible cable 591 attached to the pin carriage 187 and to this leftmost upright extension limits such rightward movement to the leftward stepwise movement of the pin carriage 187. A slot in the leftmost upright extension of the slidable paddle assembly 585 is engaged with the upper shaft 593 to effectuate the clockwise rocking of the paddle assembly 585 as the lever 597 is spring-urged in a clockwise direction by the spring 611 attached to a downwardly extending projection on the rearmost extremity of the multiplying release slide 601, such urging being transmitted to the lever 597 through the stud and slot connection. The spring-urged forward movement of the multiplying release slide 601 is permitted when, upon partial depression of the multiplier-entering motor bar 193, the lower extremity of the multiplier-entering motor bar contacts and lowers the release bail 607 against spring-urging to raise the outwardly extending projection 605 of the release bail 607 out of engagement with a raised portion in the upper surface of the multiplying release slide 601. The upward rocking of this outwardly extending projection 605 permits the multiplying release slide 601 to be moved forwardly through spring-urging to be limited either by contact of the wide rearwardly extending projection of the slidable paddle assembly 585 against the lower surfaces of forwardly displaced storing elements 27, or by contact of the roller 617 against the upright extension of a bail lever 621.

When the multiplying release slide 601 is limited in its forward movement by contact of the wide rearwardly extending projection of the slidable paddle assembly 585 against the lower surfaces of forwardly displaced storing elements 27, the rearwardly extending yielding projection 613 prevents the full upward movement of the outwardly extending projection 605 of the release bail 607, to thereby prevent sufficient downward movement of the multiplier-entering motor bar 193 to effectuate the release of the multiplier indexing slide 213 (FIGURES 7 and 11) from the upright projection of the latching plate 203, such release being required in order to initiate a multiplying operation. When the multiplying release slide 601 (FIGURE 6) is permitted its full forward spring-urged movement to be limited by contact of the roller 617 against the upright projection of the bail lever 621, the rearwardly extending projection 613 clears the outwardly extending projection 605 of the release bail 607 to permit the full upward rocking movement of the outwardly extending projection 605 and sufficient downward depression of the multiplier-entering motor bar 193 to release the multiplier indexing slide 213 (FIGURE 7) from the upright projection of the latching plate 203. An automatic multiplying operation is thereby initiated.

Figure 1:
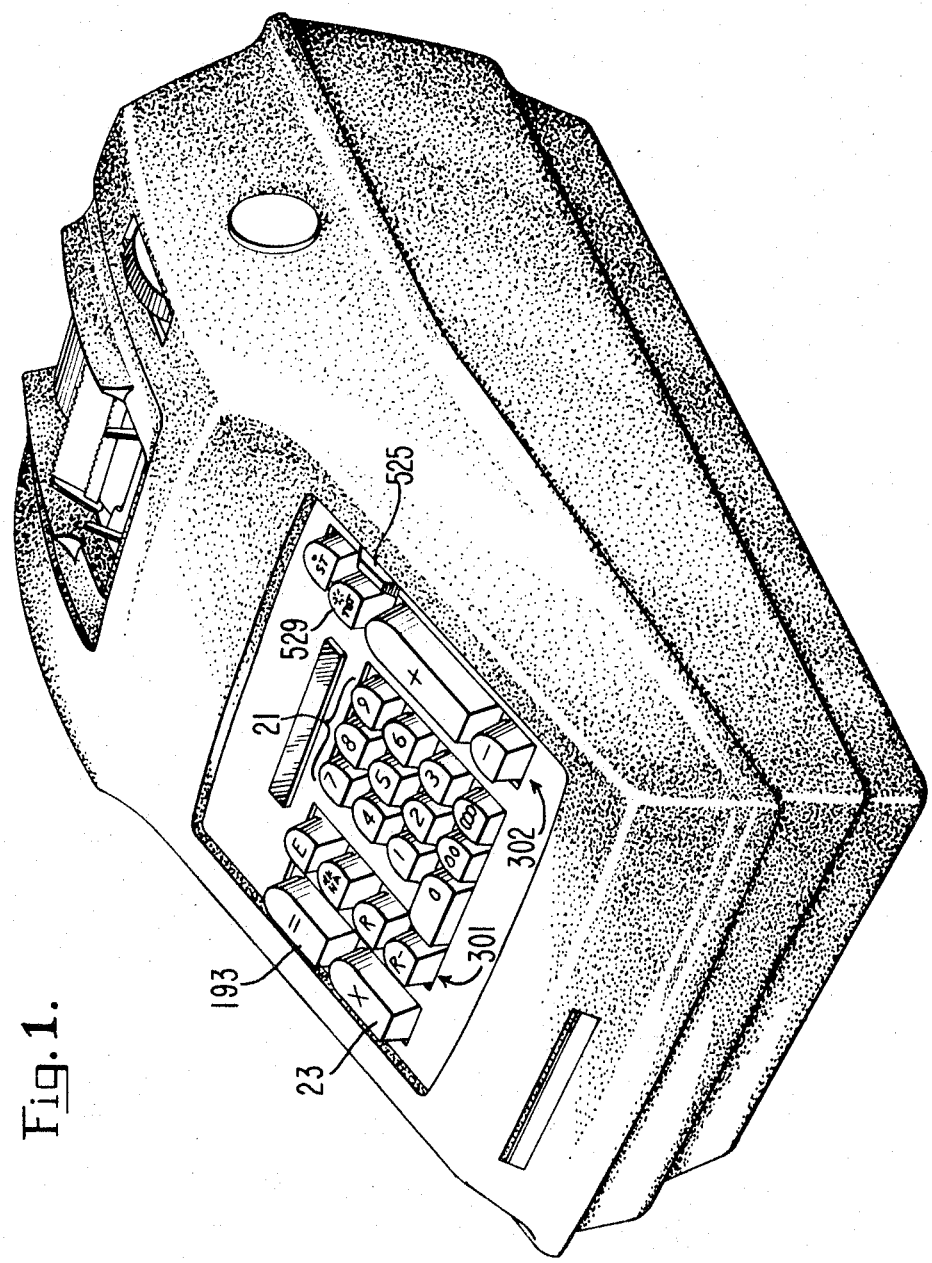
FIGURE 1 is a perspective view of the machine showing the relative positions of cycle initiating members and keyboard control means.

Blocking of the multiplying release slide 601 (FIGURE 6) by contact of the wide rearwardly extending projection of the slidable paddle assembly 585 against the lower surfaces of forwardly displaced storing elements 27 is a matter of the number of storing elements 27 that are displaced forwardly from home position during the multiplicand-entering cycle, together with the number of units of step-wise movement permitted the pin carriage 187 at the time the second multiplying factor is indexed in numerical keys 21 (FIGURE 1). Although the slidable paddle assembly 585 (FIGURE 6) is permitted rightward shifting as the pin carriage 187 escapes to the left during first factor entry, the slidable paddle assembly 585 is restored to its leftmost home position as the pin carriage 187 is restored rightwardly to its home position through conventional pin carriage restoring means during the second half of the multiplicand-entering machine cycle. As previously described, the multiplicand-entering cycle is effective to displace forwardly from home position those storing elements 27 that correspond to the number of orders in the first multiplying factor; and the multiplier is entered by depressing the numerical keys 21 (FIGURE 1). As the numerical keys 21 are so indexed, the pin carriage 187 (FIGURE 6) is permitted leftward escapement through conventional means to lower settable elements therein contained into limiting position with the type bars 127. Coincidentally with the escapement of the pin carriage 187 during second factor entry, the slidable paddle assembly 585 is permitted spring-urged rightward movement a distance corresponding to the number of digits indexed. In the event this rightward movement exceeds a distance corresponding to the difference between the number of digits in the multiplicand and ten, or, in other words, brings the wide rearwardly extending projection of the slidable paddle assembly 585 into rocking contact with the lower surface of one or more forwardly displaced storing elements 27, the clockwise rocking of the slidable paddle assembly 585 is sufficiently limited by such contact to prevent the full forward movement of the multiplying release slide 601 and the full upward rocking of the outwardly extending projection 605, to thereby prevent full depression of the multiplier-entering motor bar 193 and the consequent release of the multiplier indexing slide 213 to initiate a multiplying operation.

Once the multiplying release slide 601 and the rearwardly extending yielding projection 613 attached thereto are permitted sufficient forward spring-urged movement to release the outwardly extending projection 605 to initiate a multiplication, the release slide 601 is activated rearwardly on each multiplying cycle by a cam 609, a lever 623 and the bail lever 621 to lower the wide rearwardly extending projection of the slidable paddle assembly 585 beneath the forwardly displaced storing elements 27. This downward activation of the assembly 585 is necessary in order to prevent interference between this wide projection and the forwardly displaced storing elements 27, as the slidable paddle assembly 585 moves to the right concurrently with pin carriage escapement when a given storing element 27 is restored or advanced to its "0" or "10" position.

During the cam-activated rearward movement of the multiplying release slide 601 on each multiplying cycle, the contact of the rearwardly extending yielding projection 613 against the upwardly positioned outwardly extending projection 605 of the release bail 607 is overcome by the yielding of the spring 627 attached to the rearwardly extending projection 613. The rearward cam-activated movement of the multiplying release slide 601 also effectuates re-latching of the outwardly extending projection 605 of the release bail 607 with a raised portion on the upper surface of the release slide 601, when the multiplier-entering motor bar 193 is restored upwardly during the forward restoring movement of the multiplier indexing slide 213 on the last multiplying cycle. This cam-driven rearward movement of the multiplying release slide 601 after the outwardly extending projection 605 has been restored downwardly to normal latching position with such raised portion of the slide 601 causes the rearwardly extending yielding projection 613 attached to the release slide 601 to assume a blocking position above the outwardly extending projection 605, until the multiplier-entering motor bar 193 is subsequently depressed to initiate a succeeding multiplying operation.

Full depression of the multiplier-entering motor bar 193 is also prevented when an attempt is made to initiate a multiplication without first indexing a second multiplying factor in the numerical keys 21 (FIGURE 1). This safeguard is likewise accomplished through the trapping of the outwardly extending projection 605 (FIGURE 6) of the relase bail 607 under the rearwardly extending yielding projection 613 as the multiplying release slide 601 is denied its full forward movement by the blocking of the rightmost upright extension of the slidable paddle assembly 585 by the stationary projection 615. Since one unit of pin carriage step-wise movement and one unit of rightward travel of the slidable paddle assembly 585 are required before the rightmost upright extension of the slidable paddle assembly 585 is released from the stationary projection 615, to permit the full forward spring-urged movement of the multiplying release slide 601, a second multiplying factor consisting of at least one digit must be indexed in the numerical keys 21 (FIGURE 1) before the multiplier-entering motor bar 193 can be fully depressed. This safeguard prevents a series of automatic multiplying cycles during which no amounts are indexed for additive or subtractive accumulations in the totalizer.

It will be understood that various changes in the details and arrangements of parts, which have been herein described and illustrated in order to explain the nature of the invention, may be made by those skilled in the art within the principle and spirit of the invention.

What is claimed is:

1. An automatic multiplying mechanism incorporated in a ten key calculator having cycling means, a plurality of input keys, a step-wise movable pin carriage for receiving amounts from said input keys, indicator means, a totalizer, means for transferring amounts from said pin carriage to said totalizer, and means for retaining said transferred amounts in said pin carriage, comprising in combination:

(a) a first factor storage mechanism having a storing element for each denominational order of the first multiplying factor, (b) first factor transfer means comprising an indexing slide and a shiftable pinion assembly, said means being effective for transferring the first multiplying factor from said pin carriage to said first factor storage mechanism, (c) a first cycle initiating member cooperating with said cycling means and said first factor transfer means for initiating said transfer of said first multiplying factor, (d) a second cycle initiating member cooperating with said cycling means and said means for transferring amounts from said pin carriage to said totalizer, and cooperating also with said means for retaining transferred amounts in said pin carriage, said second cycle initiating member being effective to initiate automatic multiplying machine cycles during which the second multiplying factor is repeatedly accumulated in said totalizer under the control of said first factor storing elements, (e) a sensing device comprising activating means and a moving member which cooperates sequentially with each denominational order of said first factor storage mechanism and with said means for transferring amounts from said pin carriage to said totalizer, said device and said member being effective to additively or subtractively accumulate the second multiplying factor in the totalizer during each of said multiplying machine cycles, or to effectuate the non-adding of said second multiplying factor, (f) and a cycle counting device comprising reversible storing element driving means cooperating with said moving member of said sensing device to drive said individual storing elements in either a restoring or advancing direction, said restoring or advancing movement of said storing elements being effective to count the number of additive or subtractive accumulations of the second multiplying factor in said totalizer.

2. An automatic multiplying mechanism as defined in claim 1 wherein said plurality of first factor storing elements are displaced in unison from home position during said transfer of said first multiplying factor according to the digit values of the various denominational orders of said first factor, and restored or further advanced sequentially by said reversible storing element driving means of said cycle counting device and said moving member of said sensing device, said sequential restoring or advancing movement of individual displaced storing elements being restricted to one unit of travel during each of said automatic multiplying machine cycles.

3. An automatic multiplying mechanism as defined in claim 2 wherein said displacement of said plurality of first factor storing elements provides variable sensing limits for said moving member of said sensing device as said device cooperates sequentially with individual storing elements, said variable sensing limits in cooperation with said activating means of said sensing device providing optimum activation of said moving member when a given storing element is displaced a distance corresponding to a higher digit value of the first multiplying factor, to thereby effectuate a subtractive accumulation of said second multiplying factor in said totalizer, and providing minimum activation of said moving member when a given storing element is displaced a distance corresponding to a lower digit value of the first multiplying factor, to thereby effectuate the additive accumulation of said second multiplying factor in said totalizer.

4. An automatic multiplying mechanism as defined in claim 3 wherein, when said moving member of said sensing device cooperates with a first factor storing element which has not been displaced from home position upon first factor entry, due to the presence of a zero digit in the corresponding order of the first multiplying factor, said activation of said moving member in cooperation with said means for transferring amounts from said pin carriage to said totalizer is effective to non-add said second multiplying factor in said totalizer.

5. An automatic multiplying mechanism as defined in claim 2 wherein said restoring movement of an individual displaced first factor storing element to its home position is effective to additively accumulate the second multiplying factor in said totalizer a given number of times corresponding directly to the respective digit value of the first multiplying factor, when said digit value is of lower denomination, and wherein said further advancing movement of an individual displaced storing element to its full advanced position is effective to subtractively accumulate the second multiplying factor in said totalizer a given number of times corresponding to the tens complement of the respective digit value of the first multiplying factor, when said digit value is of higher denomination.

6. An automatic multiplying mechanism as defined in claim 3 wherein said moving member of said sensing device is activated also by said cycle counting device, said moving member being activated upwardly by said activating means of said sensing device to the sensing limits provided by said individual displaced first factor storing elements, and activated rearwardly or forwardly by said reversible driving means of said cycle counting device to restore or further advance individual storing elements one unit of travel during each automatic multiplying machine cycle.

7. An automatic multiplying mechanism as defined in claim 1 and including: storing element coupling means comprising offset projections and associated carry pawls, said means being operative through said reversible driving means of said cycle counting device during the advancing movement of a given storing element to transfer one unit of advancing movement to the leftwardly adjoining storing element as said given storing element is advanced from its initially displaced position to its full advanced position, said one unit advancement of said leftwardly adjoining storing element being effective to condition the mechanism for a subsequent additive accumulation of ten times the amount repeatedly subtracted during said advancing movement of said given storing element.

8. An automatic multiplying mechanism as defined in claim 7 and including: means operative during multiplying machine cycles for coupling said sensing device and said cycle counting device with said pin carriage to effectuate concomitant movement of said sensing device and said cycle counting device as said pin carriage partakes of its step-wise movement.

9. An automatic multiplying mechanism as defined in claim 8 and including: cycle controlling means comprising a sensing projection and cipher indexing means, said sensing projection cooperating sequentially with individual first factor storing elements to activate said cipher indexing means when an individual storing element is located in its home or full advanced positon, said activation of said cipher indexing means being effective to initiate one unit of pin carriage step-wise movement, and effective also, through said coupling of said sensing device and said cycle counting device with said pin carriage, to shift said sensing device and said cycle counting device into cooperating alignment with the leftwardly adjoining storing element.

10. An automatic multiplying mechanism as defined in claim 9 wherein said sensing projection of said cycle controlling means is cradled within the structure of said moving member of said sensing and cycle counting devices, said cradle coupling of said member and said projection being effective to shift said sensing and cycle counting devices and said cycle controlling means to the left as a unit when said pin carriage is stepped one unit of movement to the left through activation of said cipher indexing means, said leftward shifting of said devices and said means being effective to bring said moving member and said sensing projection into cooperating alignment with the leftwardly adjoining storing element.

11. An automatic multiplying mechanism as defined in claim 9 and including: a cycle terminating device comprising a sensing bail and sensing bail activating means, said sensing bail cooperating with all first factor storing elements on each multiplying machine cycle, and cooperating also with said cycling means when all storing elements are located in their home or full advanced positions to effectively terminate automatic multiplying machine cycles and to clear said pin carriage of the second multiplying factor.

12. An automatic multiplying mechanism as defined in claim 11 and including: means under control of the operator effective when a keyboard control slide is located in its second position to produce an additional machine cycle following said termination of said automatic multiplying machine cycling and said clearing of the second multiplying factor from said pin carriage, during which additional machine cycle the computed result is automatically cleared from said totalizer, and effective when said keyboard control slide is located in its first position to cause the machine to come to rest concurrently with said termination of said multiplying machine cycling with the computed result residing in said totalizer, said means cooperating with said cycling and totalizing means to accomplish said selective results.

13. An automatic multiplying mechanism as defined in claim 12 wherein said indicator means is a printer of a selective type, said printer being effective to print the first and second multiplying factors upon first and second factor entry, respectively, and to print the result of a multiplying computation during a totalizing machine cycle, said selective printing means being effective also to supress the printing of interim computations as the second multiplying factor is additively or subtractively accumulated in the various columns of the totalizer.

14. An automatic multiplying mechanism as defined in claim 12 and including: means cooperating with said automatic totalizing means and with said first factor transfer means for transferring a computed result, at the time of said totalizing, to said first factor storage mechanism.

15. An automatic multiplying mechanism as defined in claim 14 and including: means cooperating with said first factor transfer means and responsive to the operation of said first cycle initiating member, said means being effective to clear said first factor storage mechanism of a previously totalized and transferred result.

16. An automatic multiplying mechanism incorporated in a ten key calculator having cycling means, a plurality of input keys, a step-wise movable pin carriage for receiving amounts from said input keys, indicator means, a totalizer, means for transferring amounts from said pin carriage to said totalizer, and means for retaining said transferred amounts in said pin carriage, comprising in combination:
  (a) a first factor storage mechanism having a storing element for each denominational order of the first multiplying factor,
  (b) first factor transfer means for transferring the first multiplying factor from said pin carriage to said first factor storage mechanism,
  (c) a first cycle initiating member cooperating with said cycling means and said first factor transfer means for initiating the transfer of the first multiplying factor from said pin carriage to said first factor storage mechanism,
  (d) a second cycle initiating member cooperating with said cycling means and said means for transferring amounts from said pin carriage to said totalizer, and cooperating also with said means for retaining transferred amounts in said pin carriage, said second cycle initiating member being effective to initiate automatic multiplying machine cycles during which the second multiplying factor is repeatedly accumulated in said totalizer under the control of said first factor storing elements,
  (e) means cooperating with said first factor storage mechanism and with said step-wise movable pin carriage, said means being effective to prevent the activation of said second cycle initiating member when the sum of the digits of the first factor, as entered in said first factor storage mechanism, and the digits of the second factor, as entered in said step-wise movable pin carriage, exceeds the listing capacity of the machine, said prevention of said activation of said second cycle initiating member being effective to prevent initiation of a multiplying computation,
  (f) and means cooperating with said preventive means effective to prevent said activation of said second cycle initiating member when said step-wise movable pin carriage is permitted to remain in its home position through failure to enter a second multiplying factor by means of said input keys.

17. An automatic multiplying mechanism incorporated in a ten key calculator having cycling means, a plurality of input keys, a step-wise movable pin carriage for receiving amounts from said input keys, indicator means, a totalizer, means for transferring amounts from said pin carriage to said totalizer, and means for retaining said transferred amounts in said pin carriage, comprising in combination:
  (a) a first factor storage mechanism having a storing element for each denominational order of the first multiplying factor, said storing elements having series of notches of similar kind and single notches representing the home positions of said storing elements, said storing elements being displaceable from home position a distance corresponding to the digit values of said first factor,
  (b) first factor transfer means comprising an indexing slide and a shiftable pinion assembly, said means being effective for transferring the first multiplying factor from said pin carriage to said first factor storage mechanism,
  (c) a first cycle initiating member cooperating with said cycling means and said first factor transfer means for initiating said displacement of said first factor storing elements,
  (d) a second cycle initiating member cooperating with said cycling means and said means for transferring amounts from said pin carriage to said totalizer, and cooperating also with said means for retaining transferred amounts in said pin carriage, said second cycle initiating member being effective to initiate automatic multiplying machine cycles during which the second multiplying factor is repeatedly accumulated in said totalizer according to said displacement of said first factor storing elements,
  (e) and a counting device comprising storing element driving means, a moving member, sensing means and operation terminating means, said device cooperating with said notches of similar kind of said individual displaced first factor storing elements to move said storing elements one unit of travel toward their home positions during each of said multiplying machine cycles, and to limit the number of output occurrences of said accumulating outputs when said sensing means senses said single notches of all first factor storing elements.

18. In an automatic multiplying mechanism, a counting device associated with an output mechanism wherein the number of output occurrences corresponds directly to the digit values of the numbers counted, said counting device comprising:
  (a) a storing element comprising a series of notches of similar kind and a single notch representing the home position of said storing element, said storing element being presettably displaceable from a home position according to the digit value of the number to be counted,
  (b) storing element driving means comprising a moving member which cooperates with said notches of similar kind of said storing element to move said storing element one unit of travel toward its home position during each operation of said associated output mechanism, (c) and a controlling device comprising sensing means and operation terminating means, said sensing means cooperating with said storing element during each operation of said output mechanism to activate said operation terminating means when said sensing means senses said single notch representing the home position of said storing element.

19. In an automatic multiplying mechanism, a counting device associated with an output mechanism wherein the number of output occurrences corresponds directly with the digit values of the numbers counted, when said digit values are of lower denomination, and wherein the number of output occurrences corresponds to the tens complements of the digit values of the numbers counted, when said digit values are of higher denomination, said counting device comprising:

(a) a storing element comprising a series of shallow notches representing digit values of lower denomination and a series of deeper notches representing digit values of higher denomination, and comprising also two separate notches representing the home and full advanced positions of said storing element, respectively, said storing element being presettably displaceable from a home position according to the digit value of a number to be counted, (b) reversible storing element driving means comprising a moving member which cooperates with said shallow or deeper notches of said storing element during each operation of said associated output mechanism to move said storing element one unit of travel toward its home position when a shallow notch is sensed and to move said storing element one unit of travel toward its full advanced position when a deeper notch is sensed, (c) and a controlling device comprising sensing means and operation terminating means, said sensing means cooperating with said storing element during each operation of said output mechanism to activate said operation terminating means when said sensing means senses either of the notches representing the home or full advanced positions of said storing element.

20. A counting device as defined in claim 19 and including function selection means, said device being associated with a dual-function output mechanism wherein the number of output occurrences of one type of function corresponds directly with the digit values of the numbers counted, when said digit values are of lower denomination, and wherein the number of output occurrences of the opposite type of function corresponds to the tens complements of the digit values of the numbers counted, when said digit values are of higher denomination, said function selection means comprising additional sensing means cooperating with said moving member of said reversible storing element driving means and with said shallow or deeper notches of said storing element during each operation of said associated dual-function mechanism to select and initiate one type of function when a shallow notch is sensed and to select and initiate the opposite type of function when a deeper notch is sensed.

21. An automatic multiplying apparatus having cycling means, a plurality of input keys, indicator means, and a totalizer, comprising in combination:

(a) a first factor storage mechanism having a storing element for each denominational order of the first multiplying factor, (b) a second factor storage mechanism comprising a step-wise movable pin carriage effective for receiving amounts from said input keys, (c) first factor transfer means for transferring the first multiplying factor from said pin carriage to said fist factor storage mechanism, (d) a first cycle initiating member cooperating with said cycling means and said first factor transfer means for initiating the transfer of the first multiplying factor from said pin carriage to said first factor storage mechanism, said transfer resulting in the displacement of individual storing elements from home position a distance corresponding to the digit values of the first multiplying factor, (e) transfer means for additively or subtractively transferring amounts from said pin carriage to said totalizer, (f) means for retaining said additively or subtractively transferred amounts in said pin carriage, (g) a second cycle initiating member cooperating with said cycling means and said means for transferring amounts from said pin carriage to said totalizer, and cooperating also with said means for retaining transferred amounts in said pin carriage, said member being effective to initiate automatic multiplying machine cycles during which the second multiplying factor is repeatedly accumulated in said totalizer under the control of said displaced first factor storing elements, (h) a sensing device comprising activating means and a moving member which cooperates sequentially with each denominational order of said first factor storage mechanism and with said means for transferring amounts from said pin carriage to said totalizer, said device and said member being effective to additively or subtractively accumulate the second multiplying factor in said totalizer during each of said multiplying machine cycles, or to effectuate the non-adding of said second multiplying factor, (i) a cycle counting device comprising reversible storing element driving means effective for driving said individual storing elements in either a restoring or advancing direction from their initially displaced positions, said restoring or advancing movement, consisting of one unit of travel during each multiplying machine cycle, being effective to count the number of additive or subtractive accumulations of the second multiplying factor in said totalizer, (j) storing element coupling means comprising offset projections and associated carry pawls, said means being operative through said reversible driving means of said cycle counting device during the advancing movement of a given storing element to transfer one unit of advancing movement to the leftwardly adjoining storing element as said given storing element is advanced from its initially displaced position to its full advanced position, (k) means operative during multiplying machine cycles for coupling said sensing device and said cycle counting device with said pin carriage to effectuate concomitant movement of said sensing device and said cycle counting device as said pin carriage partakes of its step-wise movement, (l) cycle controlling means comprising a sensing projection and cipher indexing means, said sensing projection cooperating sequentially with individual first factor storing elements to activate said cipher indexing means when an individual storing element is located in its home or full advanced positions, said activation of said cipher indexing means being effective to initiate one unit of pin carriage step-wise movement and to shift said sensing device and said cycle counting device into cooperating alignment with the storing element of next higher order, (m) a cycle terminating device comprising a sensing bail and sensing bail activating means, said sensing bail cooperating with all first factor storing elements on each multiplying machine cycle, and cooperating also with said cycling means when all storing elements are located in their home or full advanced positions to effectively terminate automatic multiplying machine cycling and to clear said pin carriage of the second multiplying factor.

(n) and means under control of the operator effective when a keyboard control slide is located in its second position to produce an additional machine cycle following said termination of said automatic multiplying cycling and said clearing of the second multiplying factor from said pin carriage, during which additional machine cycle the computed result is automatically cleared from said totalizer, and effective when said keyboard control slide is located in its first position to cause the machine to come to rest concurrently with said termination of said multiplying machine cycling with the computed result residing in said totalizer, said means cooperating with said cycling and totalizing means to accomplish said selective results.

22. An automatic multiplying apparatus as defined in claim 21 wherein said indicator means is a printer of a selective type, said printer being effective to print the first and second multiplying factors upon first and second factor entry, respectively, and to print the result of a multiplying computation during a totalizing machine cycle, said selective printing means being effective also to suppress the printing of interim computations as the second multiplying factor is additively or subtractively accumulated in the various columns of the totalizer.

23. An automatic multiplying apparatus as defined in in claim 22 and including: means cooperating with said automatic totalizing means and with said first factor transfer means for transferring a computed result, at the time of such totalizing, to said first factor storage mechanism; and means cooperating with said first factor transfer means and responsive to the operation of said first cycle initiating member, said means being effective to clear said first factor storage mechanism of a previously totalized and transferred result.

24. An automatic multiplying apparatus as defined in claim 23 and including: means cooperating with said first factor storage mechanism and with said step-wise movable pin carriage, said means being effective to prevent the activation of said second cycle initiating member when the sum of the digits of the first factor, as entered in said first factor storage mechanism, and the digits of the second factor, as entered in said step-wise movable pin carriage, exceeds the listing capacity of the apparatus, said prevention of said activation of said second cycle initiating member being effective to prevent initiation of a multiplying computation; and means cooperating with said preventive means effective to prevent said activation of said second cycle initiating member when said step-wise movable pin carriage is permitted to remain in its home position through failure to enter a second multiplying factor by means of said input keys.

References Cited
UNITED STATES PATENTS

| | | | |
|---|---|---|---|
| 2,833,467 | 5/1958 | Christoff et al. | 235—63 |
| 2,970,754 | 2/1961 | Gang | 235—60 |
| 2,992,773 | 7/1961 | Capellaro et al. | 235—60 |
| 3,057,550 | 10/1962 | Ammon | 235—60 |

RICHARD B. WILKINSON, *Primary Examiner.*

STANLEY A. WAL, *Assistant Examiner.*